(12) United States Patent
Fujiwara et al.

(10) Patent No.: US 7,475,997 B2
(45) Date of Patent: Jan. 13, 2009

(54) REFLECTIVE DISPLAY DEVICE WITH HIGH RETROREFLECTIVITY

(75) Inventors: Sayuri Fujiwara, Nara (JP); Kiyoshi Minoura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 504 days.

(21) Appl. No.: 10/964,646

(22) Filed: Oct. 15, 2004

(65) Prior Publication Data

US 2005/0088742 A1 Apr. 28, 2005

(30) Foreign Application Priority Data

Oct. 27, 2003 (JP) ............... 2003-366158

(51) Int. Cl.
*G02B 5/122* (2006.01)
*G02F 1/1335* (2006.01)

(52) U.S. Cl. .............. 359/529; 349/113; 356/132

(58) Field of Classification Search ......... 359/529–530; 349/113

See application file for complete search history.

(56) References Cited

U.S. PATENT DOCUMENTS

| 5,182,663 | A * | 1/1993 | Jones ................. 349/113 |
| 6,657,766 | B2 | 12/2003 | Minoura et al. |
| 7,098,137 | B2 | 8/2006 | Ihara et al. |
| 2001/0040717 | A1 * | 11/2001 | Minoura et al. ........ 359/263 |
| 2002/0043931 | A1 * | 4/2002 | Minoura et al. ........ 313/506 |
| 2002/0154408 | A1 | 10/2002 | Minoura et al. |
| 2003/0124849 | A1 * | 7/2003 | Ihara et al. ........... 438/689 |
| 2004/0004765 | A1 | 1/2004 | Ihara et al. |
| 2004/0085611 | A1 | 5/2004 | Minoura et al. |

FOREIGN PATENT DOCUMENTS

| JP | 7-205322 | 8/1995 |
| JP | 11-64831 | 3/1999 |
| JP | 2002-287134 | 10/2002 |
| KR | 2001-0018578 A | 3/2001 |

OTHER PUBLICATIONS

"Precision Crystal Corner Cube Arrays for Optical Gratings Formed by (100) Silicon Planes with Selective Epitaxial Growth", Neudeck et al., Applied Optics, vol. 35, No. 19, Jul. 1, 1996, pp. 3466-3470.

* cited by examiner

*Primary Examiner*—Tarifur Chowdhury
*Assistant Examiner*—Tara S Pajoohi
(74) *Attorney, Agent, or Firm*—Nixon & Vanderhye P.C.

(57) ABSTRACT

A reflective display includes a retroreflective layer and a modulation layer, which is provided closer to a viewer than the retroreflective layer is and which is switchable between first and second states with mutually different optical characteristics. The retroreflective layer includes a two-dimensional arrangement of unit elements, which are arranged at a pitch of at most 250 μm. The retroreflective layer has a retro-reflectivity Rr of at least 45%. The retroreflectivity is defined as a ratio of the intensity of light, which has been reflected from the retroreflective layer and then received at a cone angle of 7.5 degrees by a retroreflectivity measuring system, to that of light, which has been reflected from a dielectric mirror and then received by the same retroreflectivity measuring system.

9 Claims, 11 Drawing Sheets

REFLECTIVE DISPLAY DEVICE WITH HIGH RETROREFLECTIVITY

BACKGROUND OF THE INVENTION

1. Field of the Invention

The present invention relates to a reflective display device including a retroreflector and a method for evaluating the retroreflector.

2. Description of the Related Art

Various configurations have been proposed for a reflective liquid crystal display device with a retroreflector (see Japanese Laid-Open Publication No. 2002-107519, Japanese Patent No. 3216584, and Japanese Laid-Open Publication No. 2002-287134, for example). Each of those reflective liquid crystal display devices uses no polarizers and therefore can conduct a display operation with increased brightness, and is also expected to achieve a display at a higher contrast ratio. As used herein, the "retroreflector" refers to an optical element that has a two-dimensional arrangement of very small unit elements so as to reflect any incoming light ray back to the source by way of multiple reflective surfaces thereof, no matter where the light ray has come from.

FIG. 19 shows an exemplary configuration for a reflective display device with a retroreflector as disclosed in Japanese Laid-Open Publication No. 2002-107519.

The reflective display device 9 shown in FIG. 19 includes an electrode 4, an alignment film 2, a liquid crystal layer 1, another alignment film 3, another electrode 5 and a retroreflector 8, which are stacked in this order (as viewed from over the display device by a viewer) between two substrates 6 and 7. The liquid crystal layer 1 is made of a scattering type liquid crystal material, which can switch between a transmitting state of transmitting the incoming light and a scattering state of scattering the incoming light.

Hereinafter, it will be described how the reflective display device 9 conducts a display operation in principle.

First, when the liquid crystal layer 1 is in the transmitting state, an incoming light ray 10, which has come from the vicinity of viewer's eyes, is transmitted through the substrate 6 and liquid crystal layer 1 while being refracted at the same time, incident on the retroreflector 8 and then reflected back from the retroreflector 8 as a reflected light ray 11. The reflected light ray 11 returns to the vicinity of the viewer's eyes after having been subjected to a similar refraction. Meanwhile, any other incoming light ray, which has come from elsewhere than the vicinity of the viewer's eyes, is retro-reflected by the retroreflector 8 right back to its source and never reaches the vicinity of the viewer's eyes. As a result, only the incoming light ray 10 that has come from the vicinity of the viewer's eyes is sensed by him or her, thereby achieving a black display state. Next, when the liquid crystal layer 1 is in the scattering state, light entering the liquid crystal layer 1 is either backscattered or forward scattered by, or transmitted through, the liquid crystal layer 1. The backscattered light returns to the viewer, thus contributing to the white display mode. On the other hand, the light rays that have been forward scattered by, or transmitted through, the liquid crystal layer 1 are retro-reflected by the retroreflector 8 and then enter the liquid crystal layer 1 in the scattering state again so as to be subject to the scattering action of the liquid crystal layer 1. Accordingly, most of the light that has been retro-reflected by the retroreflector 8 returns to the viewer and used to achieve the white display mode. In this manner, not only the light that has been backscattered by the liquid crystal layer 1 but also the light that has been either transmitted through, or forward scattered by, the liquid crystal layer 1 can be used for display purposes as well. Consequently, a display with a high brightness is achieved.

To operate the reflective display device 9 according to this principle, the arrangement pitch of the unit elements of the retroreflector 8 needs to be at most approximately equal to, and preferably smaller than, the pixel pitch. If the arrangement pitch of the unit elements is greater than the pixel pitch, then the incoming light ray 10, which has been transmitted through a pixel of the liquid crystal layer 1 and then retro-reflected by the retroreflector 8, may pass through another pixel of the liquid crystal layer 1 on the way back. In that case, the display might exhibit an abnormal state. For example, an incoming light ray that has passed a red color filter before reaching the retroreflector 8 may pass through a green or blue color filter on its way back, thus possibly causing a color mixture unintentionally.

The display performance of the reflective display device 9 heavily depends on the retroreflection property of the retroreflector 8. Among other things, the brightness of the black display mode is substantially determined by the retroreflectivity of the retroreflector 8 in many cases. That is to say, the higher the retroreflection property of the retroreflector 8, the greater the ratio of the brightness (or luminance) of the white display mode to that of the black display mode (i.e., the contrast ratio) and the higher the quality of the display realized.

Accordingly, for a reflective display device with a retroreflector such as the reflective display device 9 to achieve excellent display performance, the retroreflector 8 thereof needs to be a reflector that includes the unit elements at a sufficiently small arrangement pitch and has high retroreflection property.

Examples of reflectors functioning as the retroreflector 8 include a reflector obtained by densely packing spherical beads and a reflector obtained by regularly arranging unit elements such as corner cubes. Among these various types of reflectors, a reflector with an arrangement of corner cubes (which is often called a "corner cube reflector") is generally believed to achieve the highest possible retroreflection property. In a reflector densely packed with beads on the other hand, a gap is created inevitably between the beads, no matter how densely those beads are packed, and such a gap never contributes to retroreflection. For example, in a reflector, which is two-dimensionally packed most densely with beads of the same diameter, the percentage of the total area of those non-retroreflective portions (i.e., the gaps) to the overall surface area is estimated to be as high as slightly less than 10% (e.g., 9.3%) per unit area. Meanwhile, in a reflector with an arrangement of triangular pyramidal concave portions among various retroreflectors called "corner cube reflectors", the percentage of the total area of non-retroreflective portions to the overall surface area is estimated to be about 30% per unit area. As can be seen, in those reflectors obtained by densely packing beads or arranging triangular pyramidal concave portions, the percentage of the non-retroreflective portions to the overall reflector is too high to achieve sufficiently high retroreflectivity. On the other hand, in a square corner cube reflector (i.e., a reflector with a square corner cube array obtained by regularly arranging a plurality of unit elements, called "square cube corners", each consisting of three square planes that are opposed perpendicularly to each other) among various corner cube reflectors, the percentage of those non-retroreflective portions is estimated to be zero in a plan view, theoretically speaking. Thus, such a square corner cube reflector is expected to achieve sufficiently high retroreflection property. As used herein, the "corner cube" or "square cube corner" includes a structure having a substantially corner cube shape or a substantially square corner cube shape. More specifically, a square cube corner is a structure having at least three sets of mountain lines and valley lines.

In view of these considerations, if a square corner cube reflector is used as the retroreflector 8, then a high retroreflection property should be achieved theoretically speaking and a high-quality display could be realized.

Actually, however, it is extremely difficult even to make a square corner cube reflector at such a small arrangement pitch (of 250 µm or less, for example). None of the cited references mentioned above (namely, Japanese Laid-Open Publication No. 2002-107519, Japanese Patent No. 3216584, and Japanese Laid-Open Publication No. 2002-287134) provides a specific method of making a square corner cube reflector at that small arrangement pitch. Likewise, none of the other conventional methods of making square corner cubes mechanically such as a plate method and a pin bundling method is suitable to making a square corner cube reflector at that small arrangement pitch.

Meanwhile, Japanese Laid-Open Publication No. 7-205322 discloses a method of making a square corner cube array by a photochemical technique. In this method, a photoresist film is patterned with a mask having a plurality of equilateral triangular transparent regions. Each of these transparent regions of this mask has variable transmittance that gradually decreases from its center toward its periphery. By performing exposing and developing process steps with such a mask, a number of triangular pyramidal photoresist pattern elements are formed on a substrate. Then, the substrate, which is partially covered with those photoresist pattern elements, is etched by a predetermined technique so as to have a plurality of protrusions in the same shape as the photoresist pattern elements. In this manner, an array of corner cubes can be formed on the substrate.

Furthermore, a technique of forming a cubic corner cube of a very small size, consisting of three square planes that are opposed perpendicularly to each other, is described in "Precision Crystal Corner Cube Arrays for Optical Gratings Formed by (100) Silicon Planes With Selective Epitaxial Growth", Applied Optics Vol. 35, No. 19, pp. 3466-3470. According to this technique, an oxide film for use to control the crystal growth is locally provided on (111) planes of a silicon substrate to cause an epitaxial growth of crystals on the substrate, thereby forming an array of corner cubes of a very small size thereon.

Thus, according to the non-mechanical method disclosed in Japanese Laid-Open Publication No. 7-205322 or Applied Optics Vol. 35, No. 19, pp. 3466-3470, a square corner cube reflector can be formed at an even smaller arrangement pitch but it is still difficult to make a square corner cube reflector with a sufficiently high retroreflection property.

The reason is that the retroreflection property of a square corner cube reflector depends heavily on the shape precision of each of the three square planes that make up one unit element (i.e., a single square corner cube), the planarity of each of those planes (i.e., the angular precision of each plane) or the precision of a joint portion between two adjacent planes, all of which will be referred to herein as "shape precision" collectively. According to the non-mechanical methods mentioned above, it is difficult to make a square corner cube array in an almost ideal shape, and therefore, the actual retroreflection property deteriorates significantly from its theoretical one.

More particularly, as for a square corner cube obtained by a photochemical method as disclosed in Japanese Laid-Open Publication No. 7-205322, it is difficult to ensure high plane precision (i.e., planarity). In that method, the plane precision of each side surface of a square corner cube depends on that of a triangular pyramidal photoresist pattern element on the substrate. However, to increase the plane precision of the photoresist pattern element, the processing steps of exposing and developing the photoresist layer should be controlled strictly enough by making the variation in transmittance or opacity of the mask constant, for example. Actually, though, such a strict process control is hard to realize.

Furthermore, according to the method utilizing the selective growth of silicon as disclosed in Applied Optics Vol. 35, No. 19, pp. 3466-3470, it is difficult to control the lateral growth of crystals. Also, a silicon dioxide film to be deposited on a silicon substrate to determine the square corner cube pattern and a film to be stacked thereon are likely deformed significantly at the end surfaces thereof. Thus, it is not easy to make a square corner cube array in its intended shape by such a method, either.

Thus, it has been very difficult to make a square corner cube array, consisting of unit elements that are arranged at a sufficiently small pitch (e.g., 250 µm or less), with high accuracy. In particular, the smaller the arrangement pitch of unit elements, the lower the shape precision of the square corner cube array and the less satisfactory the resultant retroreflection property tends to be. Accordingly, when the reflective display device is fabricated using a retroreflector 8 including the conventional square corner cube array, the quality of black display mode deteriorates particularly significantly. As a result, the desired display performance (such as a contrast ratio) cannot be achieved.

Meanwhile, Japanese Laid-Open Publication No. 2002-107519 discloses a configuration for improving the quality of black display mode, and eventually the display performance, by providing a light absorbing surface portion for each unit element of the retroreflector 8. In such a configuration, the contrast ratio can be increased significantly with the retroreflectivity of the retroreflector kept low (e.g., 40% or less). Consequently, high-quality display is realized.

When the configuration of Japanese Laid-Open Publication No. 2002-107519 is adopted, however, the light absorbing surface portion needs to be provided for the unit element of a very small size, thus complicating the manufacturing process too much. What is worse, the retroreflection property of the retroreflector slightly deteriorates, and therefore, the quality of white display mode cannot be improved. For that reason, this configuration can increase the contrast ratio to only a limited degree.

SUMMARY OF THE INVENTION

In order to overcome the problems described above, preferred embodiments of the present invention provide a reflective display device that achieves excellent display performance with a retroreflector.

A reflective display device according to a preferred embodiment of the present invention preferably includes: a retroreflective layer; and a modulation layer, which is provided closer to a viewer than the retroreflective layer is and which is switchable between first and second states with mutually different optical characteristics. The retroreflective layer preferably includes a two-dimensional arrangement of unit elements, which may be arranged at a pitch of at most 250 µm. The retroreflective layer preferably has a retro-reflectivity Rr of at least 45%. The retroreflectivity is preferably defined as a ratio of the intensity of light, which has been reflected from the retroreflective layer and then received at a cone angle of 7.5 degrees by a retroreflectivity measuring system, to that of light, which has been reflected from a dielectric mirror and then received by the same retroreflectivity measuring system.

In one preferred embodiment of the present invention, the retroreflective layer preferably has a retroreflectivity Rr of 60% or more.

In another preferred embodiment, the unit elements are preferably square corner cubes.

In still another preferred embodiment, the unit elements preferably have an arrangement pitch of 20 μm or less.

In yet another preferred embodiment, the unit elements preferably have an arrangement pitch of at least 100 nm, and more preferably have an arrangement pitch of 500 nm or more.

In yet another preferred embodiment, the first state may be a transmitting state in which the modulation layer transmits incident light, while the second state may be a scattering state in which the modulation layer scatters the incident light. In that case, the display device preferably enters a black display mode while the modulation layer is in the transmitting state and preferably enters a white display mode while the modulation layer is in the scattering state.

In this particular preferred embodiment, the ratio of the luminance of the white display mode, which is measured by a luminance measuring system with a light receiving angle set to 3 degrees, to that of the black display mode, which is also measured by the same luminance measuring system, is preferably 5 or more. More preferably, the ratio of the luminance of the white display mode, which is measured by a luminance measuring system with a light receiving angle set to 3 degrees, to that of the black display mode, which is also measured by the same luminance measuring system, is 10 or more.

In yet another preferred embodiment, if the brightness of the white display mode is measured by the luminance measuring system with the retroreflectivity Rr of the retroreflector changed, the modulation layer is preferably made of a liquid crystal material that increases the brightness of the white display mode as the retroreflectivity Rr of the retroreflector increases.

An evaluation method according to a preferred embodiment of the present invention is a method of estimating the retroreflectivity of a retroreflector with a two-dimensional arrangement of unit elements, which are arranged at a pitch of at most 250 μm. The method preferably includes the steps of: (a) focusing light through an objective lens, having a predetermined focusing angle, onto the retroreflector; (b) getting the light that has been focused on, and then reflected from, the retroreflector received by the objective lens; (c) measuring the intensity $I_l$ of the received light that has been reflected from the retroreflector; (d) making the light incident perpendicularly onto a dielectric mirror by way of the objective lens; (e) getting the light that has been incident on, and then reflected from, the dielectric mirror received by the objective lens; (f) measuring the intensity $I_r$ of the received light that has been reflected from the dielectric mirror; and (g) determining whether or not an $I_l/I_r$ ratio, which is the ratio of the intensity $I_l$ measured in the step (c) to the intensity $I_r$ measured in the step (f), is 45% or more.

In one preferred embodiment of the present invention, the predetermined focusing angle is preferably 20 degrees or less.

In another preferred embodiment, the step (a) preferably includes the step of forming a beam spot on the retroreflector by focusing the light. The diameter of the beam spot is preferably at least three times as large as the arrangement pitch of the unit elements.

In this particular preferred embodiment, the unit elements are preferably square corner cubes.

According to various preferred embodiments of the present invention described above, the display performance of a reflective display device with a retroreflector is improvable in terms of the quality of black and white display modes and contrast ratio.

Preferred embodiments of the present invention also provide a highly reliable method of evaluating the retroreflection property of a retroreflector easily. By adjusting the retroreflectivity of the retroreflector as measured by this method, the display performance of a reflective display device, including the retroreflector, can be controlled.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
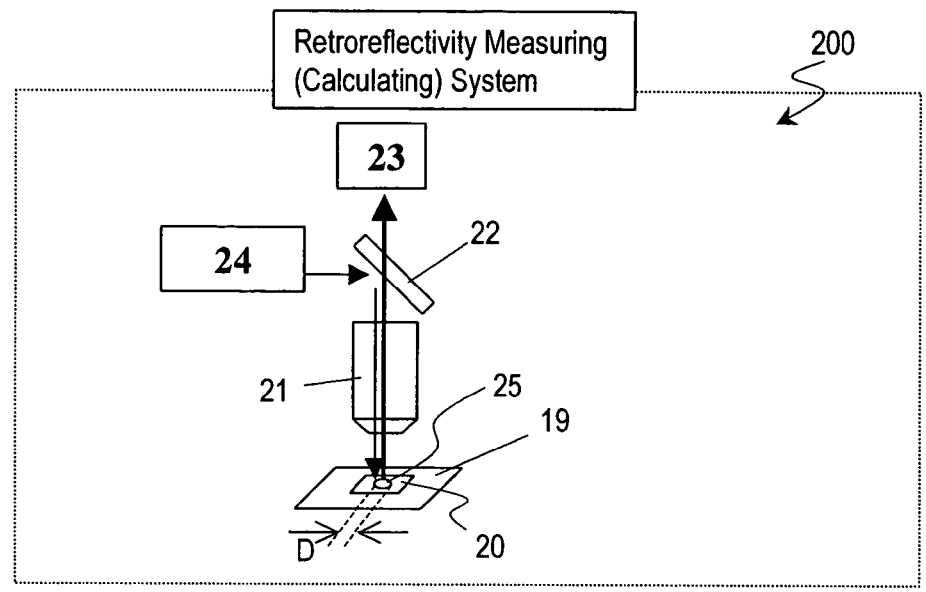
FIG. 1 shows a configuration for a retroreflection property evaluation system according to a preferred embodiment of the present invention.

As described above, the display performance of a reflective display device with a retroreflector heavily depends on the retroreflection property of the retroreflector. However, no highly reliable method of evaluating the retroreflection property of a retroreflector has been established yet. Accordingly, it has been difficult to understand quantitatively the relationship between the retroreflection property of the retroreflector and the resultant display performance such as display brightness and contrast ratio. Among other things, almost no documents have ever mentioned exactly how to evaluate the property of a retroreflector for use as a display for a personal computer or a mobile telecommunications unit such as a cell phone or a PDA and how good the retroreflection property of the retroreflector should be to realize a realistic display.

Thus, the present inventors earnestly worked on, and finally came up with, conceivably the best method of evaluating the retroreflection property of a retroreflector, including judgment on whether or not the property of the retroreflector was good enough to use it for a reasonably long period of time. By using that evaluation method, we also analyzed exactly what beneficial effects the property of such a retroreflector had on the display performance of a reflective display device including the retroreflector. As a result, we discovered that the display quality of a reflective display device with a retroreflector was controllable by adjusting the retroreflectivity of the retroreflector.

Hereinafter, a method of evaluating the retroreflection property of a retroreflector according to a preferred embodiment of the present invention will be described with reference to the accompanying drawings.

Method for Evaluating Retroreflection Property

According to the present invention, the retroreflection property of a retroreflector is evaluated by measuring the retroreflectivity thereof. The retroreflectivity may be measured with an evaluation system 200 such as that shown in FIG. 1, which has basically the same configuration as an incident microscope.

The evaluation system 200 includes a stage 19 to fix a sample retroreflector 20 thereon, an objective lens 21 (with a focusing angle of 7.5 degrees, for example), a light source 24 for emitting white light, a half mirror 22 and a photodetector 23. The objective lens 21, half mirror 22 and photodetector 23 are arranged perpendicularly to the stage 19. The half mirror 22 is arranged such that the light that has been emitted from the light source 24 is reflected by the mirror 22 and incident perpendicularly to the sample retroreflector 20 fixed on the stage 19. The photodetector 23 is provided right over the objective lens 21 so as to receive the light that has been reflected perpendicularly from the sample retroreflector 20 and then passed through the objective lens 21.

Hereinafter, it will be described how to measure the retroreflectivity Rr with this evaluation system 200.

First, a sample retroreflector 20 to evaluate is prepared. The sample retroreflector 20 has a structure in which a lot of unit elements (such as corner cubes) are arranged two-dimensionally.

Next, this sample retroreflector 20 is fixed on the stage 19. Subsequently, the light that has been emitted from the light source 24 is reflected from the half mirror 22 and then incident perpendicularly onto the sample retroreflector 20 by way of the objective lens 21 with a focusing angle of 7.5 degrees. In this case, a beam spot 25 (with a diameter D of 1 mm, for example) is formed by the incident light on the sample retroreflector 20. The incident light is then reflected by the sample retroreflector 20. In this reflected light, a portion that has been reflected substantially perpendicularly is received by the photodetector 23 by way of the objective lens 21. As a result, the intensity $I_l$ of the substantially perpendicularly reflected light is measured.

It should be noted that the light reflected from the sample retroreflector 20 needs to include retro-reflected light. As used herein, the "retro-reflected light" refers to reflected light having a negative vector with respect to the vector of the incident light and is produced by getting the light entering the sample retroreflector 20 reflected by at least two planes among a number of planes that make up a single unit element of the sample retroreflector 20.

Next, a dielectric mirror is prepared as a reference and placed on the stage 19 of the evaluation system 200 instead of the sample retroreflector 20. Subsequently, as in the sample retroreflector 20, the light that has been emitted from the light source 24 is reflected from the half mirror 22 and then incident perpendicularly onto the dielectric mirror by way of the objective lens 21. The light reflected substantially perpendicularly by the dielectric mirror is received by the photodetector 23 by way of the objective lens 21. As a result, the intensity $I_r$ of the substantially perpendicularly reflected light is measured.

Thereafter, an $I_l/I_r$ ratio, i.e., the ratio of the intensity $I_1$ of the light reflected by the sample retroreflector 20 to the intensity $I_r$ of the light reflected by the dielectric mirror, is calculated. This $I_l/I_r$ ratio (%) will be referred to herein as the retroreflectivity Rr of the sample retroreflector 20.

In the evaluation method of this preferred embodiment, the intensity $I_l$ of the light reflected from the sample retroreflector 20 is measured first, and then the intensity $I_r$ of the light reflected from the dielectric mirror is measured. Alternatively, the intensity $I_r$ may be measured first.

This evaluation method is supposed to be applied to evaluating a retroreflector for use in a display panel that may be used personally, in particular. Such a retroreflector has an arrangement pitch, which is approximately equal to, or smaller than, the pixel pitch of a display panel, for example. Accordingly, the sample retroreflector 20 to be evaluated by this evaluation method preferably has an arrangement pitch of at most 250 μm, more preferably 20 μm or less.

To make a more reliable evaluation with this evaluation system, the diameter D of the beam spot 25, formed by the emission of the light source 24 on the sample retroreflector 20, is preferably controlled so as to be at least equal to the arrangement pitch of the unit elements of the sample retroreflector 20. This is because if the beam spot diameter D were smaller than the arrangement pitch of the unit elements, then the retroreflectivity Rr measured would vary greatly according to the specific location of the beam spot 25 on the sample retroreflector 20. For example, if the beam spot 25 is formed at the center of a unit element, the retro-reflectivity Rr measured will be high. On the other hand, if the beam spot 25 is formed around the periphery of a unit element (i.e., around the junction between two adjacent unit elements), then the retro-reflected light is less likely to enter the photodetector 23 and the retroreflectivity Rr measured will decrease. In that case, it will be more difficult to evaluate the retroreflection property of the sample retroreflector 20 accurately. More preferably, the diameter D of the beam spot 25 is at least three times as large as the arrangement pitch. In that case, the retroreflectivity Rr measured will be affected to a much lesser degree by the specific location of the beam spot 25 or the variation in retroreflection property between the unit elements. Thus, the evaluation can be made with much more reliability. The diameter D of the beam spot 25 is even more preferably at least ten times as large as the arrangement pitch.

The focusing angle of the objective lens 21 does not have to be 7.5 degrees but may be controlled appropriately so as to form a beam spot 25 of the preferred size mentioned above. Nevertheless, the focusing angle of the objective lens 21 is preferably no greater than 20 degrees. This is because if the focusing angle exceeded 20 degrees, then the beam spot 25 formed on the sample retroreflector 20 would decrease its size too much. In that case, the retroreflectivity Rr measured would vary significantly according to the specific location of the beam spot 25. In addition, even the non-retro-reflected returned light (such as scattered light that has deviated from the three planes making up one square corner cube) could be more likely focused unintentionally.

This evaluation method cannot be used effectively to evaluate a retroreflector consisting of unit elements of a big size (e.g., a retroreflector for use in a road sign) because in that case, it is difficult to form the beam spot 25 in an appropriate size as described above. However, this evaluation method would also be effective if an objective lens 21 of a special big size were available to cope with such a large diameter D of the beam spot 25.

Method of Rating Display Performance

Hereinafter, a method of rating the display performance of a display device including a retroreflector as adopted by the present inventors will be described.

Figure 2:
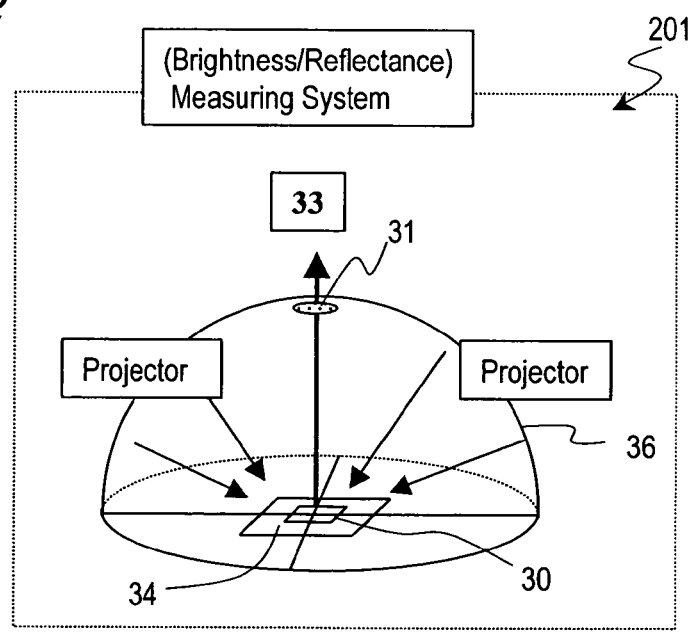
FIG. 2 shows a configuration for a system of measuring display brightness (or luminance) for use in a preferred embodiment of the present invention.

The display performance was rated with a measuring system 201 such as that shown in FIG. 2. As shown in FIG. 2, the measuring system 201 includes a measuring stage 34, a photodetector 33 and projectors 36. The stage 34 is arranged such that its upper surface (i.e., the measuring plane) lies horizontal. The projectors 36 create a hemispherical projection space (with a radius of 8 cm, for example), which is defined with respect to the center of the measuring plane on the measuring stage 34. The projectors 36 also have a light transmitting plane 31 (with a diameter of 1 cm, for example), which is defined right over the center of the measuring plane. The photodetector 33 is located over the light transmitting plane 31 of the projectors 36.

Next, it will be described how to rate the display performance with this measuring system 201.

First, a sample device 30 is prepared. The sample device 30 may be a display device including a retroreflector and a liquid crystal layer, for example. The liquid crystal layer may be made of a liquid crystal material, which is switchable between scattering state and light transmitting state. The specific structure and manufacturing method of the sample device 30 will be described later.

Next, the brightness (or luminance) of the sample device 30 in its white display mode is measured. With the liquid crystal layer thereof turned into the scattering state, the sample device 30 is put on the measuring stage 34. The light projected from the projectors 36 reaches the center of the hemisphere (i.e., the center of the measuring plane) at the same brightness from every direction of the hemisphere except the light transmitting plane 31. Among the light rays reflected from the sample device 30, the light rays transmitted through the light transmitting plane 31 are received by the photodetector 33, which is located above the projectors 36. In this example, the photodetector 33 is supposed to receive the light rays at 3 degrees. However, the light receiving angle does not have to be 3 degrees. In this manner, the intensity $I_W$ of the light received by the photodetector 33 is measured.

Also, a totally diffusive reflector is put as a reference in this measuring system 201 instead of the sample device 30 and the intensity $I_{r2}$ of the light rays that have been reflected from the totally diffusive reflector and then received at the photodetector 33 is measured.

The brightness of the sample display device 30 in its white display mode is obtained as the ratio $(I_W/I_{r2})(\%)$ of the light intensity $I_W$ to the intensity $I_{r2}$ of the light when the reference is used.

Next, the brightness of the sample device 30 in its black display mode is measured. The liquid crystal layer of the sample device 30 is turned into the light transmitting state and then light is projected as described above from the projectors 36 in various directions toward the sample display device 30. If the incoming light were all retro-reflected by the sample device 30, the retro-reflected light would not be transmitted through the light transmitting plane 30. Actually, however, a portion of the incoming light is not retro-reflected by the sample device 30 but reflected toward, and transmitted through, the light transmitting plane 31 and then received by the photodetector 33. The intensity $I_b$ of the light received by the photodetector 33 at this time is measured.

The brightness of the sample display device 30 in its black display mode is also obtained as the ratio $(I_b/I_{r2})(\%)$ of the light intensity $I_b$ to the intensity $I_{r2}$ of the light when the reference is used.

Based on the brightnesses of the black and white display modes obtained in this manner, the contrast ratio of the sample display device 30 is obtained as the ratio $I_W/I_b$ of the brightness of the white display mode $I_W$ to that of the black display mode $I_b$.

How Display Performance Changes with Retroreflectivity Rr

The present inventors carried out experiments in accordance with the method of evaluating the retroreflection property of the retroreflector and the method of rating the display performance of the display device to know how the display performance of the display device with the retroreflector changed with the retroreflectivity Rr of the retroreflector. Specifically, the experiments were performed in the following manner.

For those experiments, a number of sample retroreflectors with different degrees of shape precision were used. First, the retroreflectivities Rr of these sample retroreflectors were measured with the evaluation system 200 shown in FIG. 1.

Next, a transparent layer (e.g., CR440 produced by Hitachi Chemical Co., Ltd.) was provided on the surface of each sample retroreflector and the resultant assembly was used as a sample device, of which the brightness in the black display mode was measured with the measuring system 201 shown in FIG. 2. Alternatively, the brightness in the black display mode may be measured with a transparent substrate such as a glass plate or a film put on the sample retroreflector or with the gap between the sample retroreflector and the transparent substrate filled with a resin, of which the refractive index was approximately equal to that of the transparent substrate. Optionally, the brightness may also be measured using the sample retroreflector by itself for convenience sake.

Subsequently, various types of scattering layers were provided on the sample retroreflectors, thereby obtaining a number of sample devices. And the brightness of each of these sample devices in its white display mode was measured with the measuring system shown in FIG. 2. Various types of scattering films or scattering liquid crystal cells may be used as the scattering layers. Also, the contrast ratio was calculated as the ratio of the brightness in the white display mode to that in the black display mode.

Figure 3:
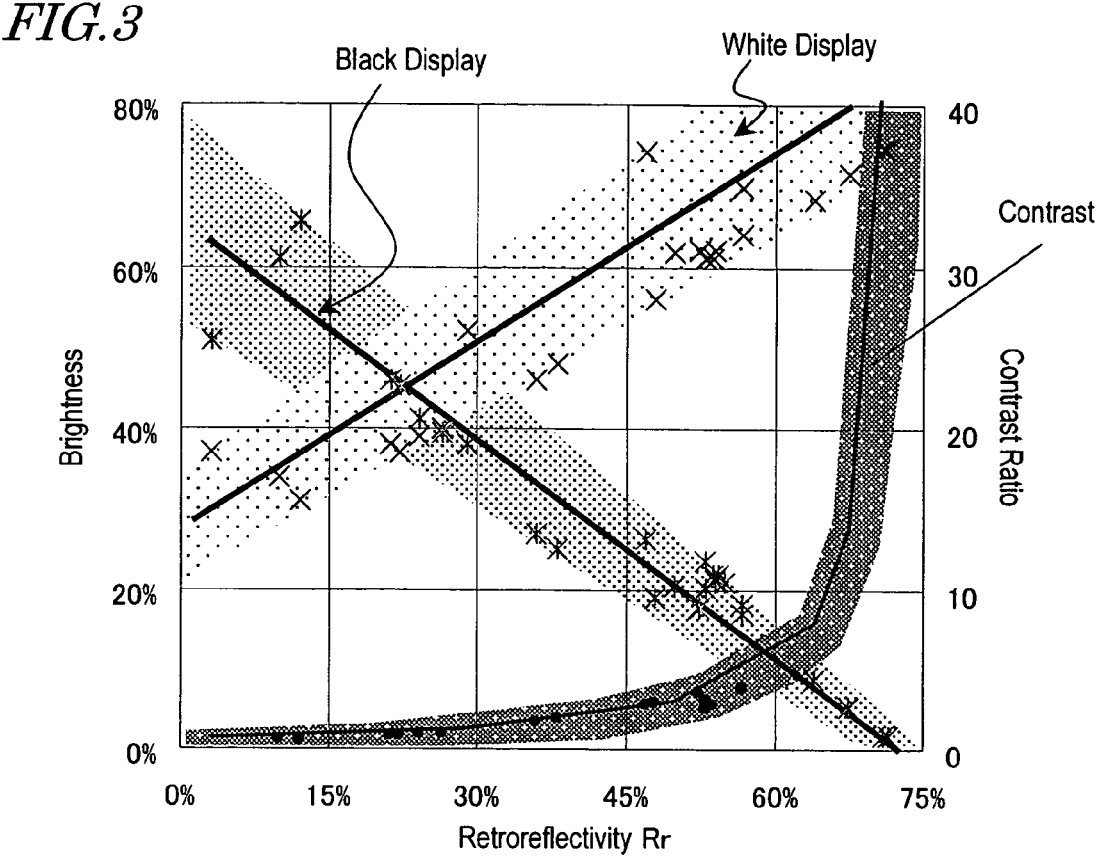
FIG. 3 is a graph showing how the display brightness changes with the retroreflectivity Rr.

As a result, a relationship between the retroreflectivity Rr and the display performance such as that shown in FIG. 3 was obtained. As can be seen from the results shown in FIG. 3, the higher the retroreflectivity Rr, the lower the brightness in the black display mode (i.e., the higher the quality of the black display mode). Also, although there was some variation according to the type of the scattering layer, the higher the retroreflectivity Rr, the higher the brightness in the white display mode (i.e., the higher the quality of the white display mode). Accordingly, the contrast ratio increased steeply as the retroreflectivity Rr increased.

More specifically, if the retroreflectivity Rr was 20% or less, the black display mode was brighter than the white display mode and the contrast ratio was less than 1. Consequently, display operation could not be conducted normally. However, if the retroreflectivity Rr was 45% or more, the contrast ratio was 3 or more. Thus, any practical display device was realized according to the intended application. For example, if the retroreflectivity Rr was 55% or more, the contrast ratio was no less than 5. A contrast ratio of 5 or more is high enough to present mainly graphics, tables and so on as in an information display terminal. In fact, the contrast ratio of an actual newspaper is approximately 5. However, to present video of an animation picture caliber, the contrast ratio is preferably at least about 10. To achieve a contrast ratio of 10 or more, the retroreflectivity Rr needs to be at least 65%. And if the retroreflectivity Rr exceeds 70%, then the contrast ratio will be 20 or more, thus realizing a high-quality display that makes normal TV pictures fully enjoyable. It should be noted that these values of retroreflectivity Rr and contrast ratio are nothing but examples and may fall within broader ranges in actuality.

In this manner, the present inventors successfully understood quantitatively the relationship between the retroreflectivity Rr and the display performance.

Nevertheless, it should also be noted that a real display device actually has a much more complicated structure than the sample device subjected to the measurement. Specifically, an actual display device includes not only the layer that can switch from the light transmitting state into the scattering state, or vice versa, but also color filters, transparent electrodes, TFTs and so forth. Thus, the display performance of the real display device is not identical with that shown in FIG. 3.

Hereinafter, the configurations of display devices according to various preferred embodiments of the present invention will be described. The present inventors also evaluated the retroreflection property, and rated the display performance, of the display device of each of those preferred embodiments, and the results of that evaluation will be described as well.

Embodiment 1

Hereinafter, a reflective display device according to a first specific preferred embodiment of the present invention will be described.

First, the configuration of a display device 103 according to this preferred embodiment will be described with reference to FIG. 4. The display device 103 includes a retroreflector 48 and a liquid crystal cell 40, which is provided closer to the viewer than the retroreflector 48 is.

The liquid crystal cell 40 includes a pair of transparent substrates 41 and 42 facing each other and a liquid crystal layer 47 interposed between the substrates 41 and 42. The transparent substrates 41 and 42 are made of a transparent material such as glass or a polymer film. On the surface of the transparent substrate 41 provided closer to the viewer, a transparent electrode 43 and an alignment film 45 are stacked in this order so as to face the liquid crystal layer 47. On the surface of the other transparent substrate 42, a transparent electrode 44 and an alignment film 46 are also stacked in this order so as to face the liquid crystal layer 47, too. The liquid crystal layer 47 may be made of any liquid crystal material as long as the layer 47 can switch between two states with mutually different optical characteristics (e.g., a scattering state and a transmitting state). These two states may be switched with an external stimulus such as an applied voltage. The material of the liquid crystal layer 47 may be a high-molecular weight or low-molecular weight scattering liquid crystal material. In this preferred embodiment, the liquid crystal layer 47 is made of a scattering liquid crystal material of an inversion type (i.e., transparent with no voltage applied and scattering with a voltage applied), which has a liquid crystal skeleton (e.g., mesogen groups) in its polymer structure. It should be noted that the liquid crystal cell 40 may be replaced with a modulator including a modulation layer (which does not have to be a liquid crystal layer) that can switch between two states with different optical characteristics.

The retroreflector 48 includes a square corner cube array 49 and a metal layer 50 deposited on the surface of the corner cube array 49. The metal layer 50 is made of a material with high reflectivity. The higher the metal reflectivity of the metal layer 50, the higher the retroreflectivity Rr of the retroreflector. In this preferred embodiment, the metal layer 50 is preferably made of Ag in view of its actual structure because Ag has a relatively high metallic reflectivity among various metals readily available.

The ideal shape of a square corner cube array 49 will be described with reference to FIGS. 7A and 7B. The square corner cube array 49 has a structure in which a plurality of square corner cube unit elements 49U, each consisting of three planes S1, S2 and S3 defined by {100} families of planes of grown crystals, are arranged as an array. The three planes S1, S2 and S3 that make up one unit element 49U are three substantially square planes that are opposed perpendicularly to each other. Also, the square corner cube array 49 obtained in this manner has a solid shape as a combination of convex portions 49a, each including a peak point 97, and concave portions 49b, each including a bottom point 98. When viewed from over the square corner cube array 49, each square corner cube unit element 49U has the shape of a rectangular hexagon consisting of the peak points 97 and saddle points 99 or the bottom points 98 and saddle points 99. The arrangement pitch of the square corner cube unit elements 49U is preferably much smaller than the pixel pitch of the display device, and may be 10 μm in this preferred embodiment.

The display device 103 may be fabricated by the following method, for example.

First, a method of making the liquid crystal cell 40 will be described. A transparent electrode 43, 44 (made of ITO, for example) and an alignment film 45, 46 are stacked in this order on each of the transparent substrates 41 and 42 by known techniques. Then, the transparent substrates 41 and 42 are opposed to each other such that the alignment films 45 and 46 face each other inside and a liquid crystal material is injected into the gap between the substrates 41 and 42, thereby forming a liquid crystal layer 47 with a thickness of 10 μm, for example. The liquid crystal material may be the reverse scattering liquid crystal material mentioned above, which is obtained by exposing a mixture of a low-molecular weight liquid crystal material, 4% of monoacrylate with mesogen groups, 2% of diacrylate with mesogen groups and a 1% of reaction initiator to ultraviolet rays (with an intensity of 1 mW/cm$^2$) for 20 minutes, for example. The composition and curing conditions of the liquid crystal material are not limited to these composition and conditions. The liquid crystal material does not have to be an inversion type, either, but may be a normal scattering liquid crystal material (which is scattering with no voltage applied and is transparent with a voltage applied thereto) including no liquid crystal skeletons in its polymer structure.

Hereinafter, a method of making the square corner cube array 49 of the retroreflector 48 will be described with reference to FIGS. 5A through 5I and FIGS. 6A through 6I. FIGS. 5A through 5I are plan views of the substrate in respective process steps. FIGS. 6A through 6I are cross-sectional views schematically showing the surface portion of the substrate in the respective process steps as viewed on the plane VI-VI shown in FIG. 5I.

Figure 7A:
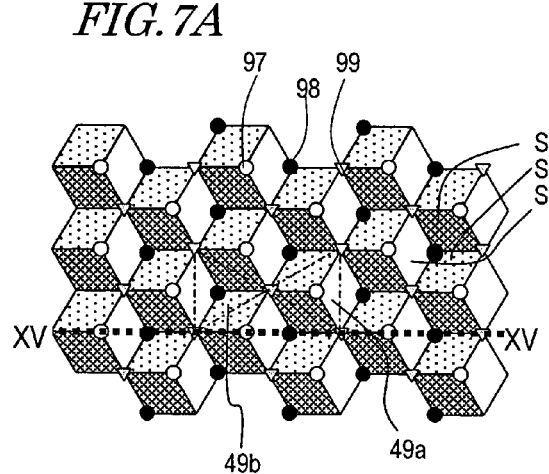
FIGS. 7A and 7B are respectively a plan view and a perspective view illustrating a portion of a square corner cube array.
Figure 7B:
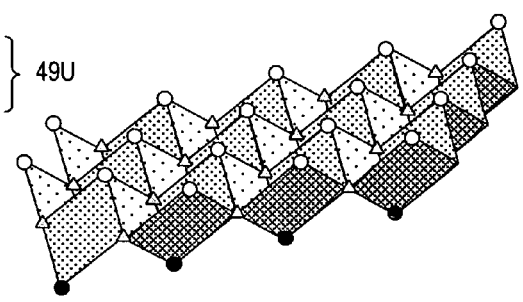

In this preferred embodiment, a cubic single crystalline substrate (e.g., a substrate made up of GaAs crystals having a sphalerite structure) is used, solid shape elements with a predetermined pattern are defined on the substrate by a wet etching process, and then crystals are grown anisotropically on the substrate, thereby making the square corner cube array 49 shown in FIGS. 7A and 7B.

Figure 5A:
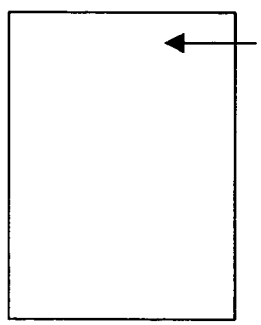
FIGS. 5A through 5I are plan views illustrating respective process steps for making a retroreflector according to the first preferred embodiment of the present invention.
Figure 6A:
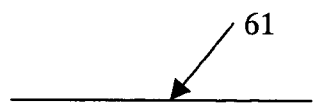
FIGS. 6A through 6I are cross-sectional views illustrating structures obtained by the process steps shown in FIGS. 5A through 5I, respectively.

First, a substrate 61, made up of GaAs crystals having a sphalerite structure, is prepared as shown in FIG. 5A. The surface of the substrate 61 is substantially parallel to the {111}B planes and is preferably mirror-polished as shown in FIG. 6A.

Figure 5B:
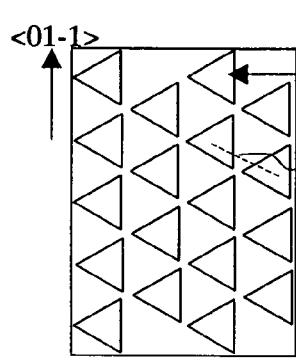
Figure 6B:
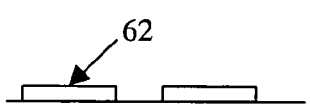

Next, as shown in FIGS. 5B and 6B, the surface of the substrate 61 is spin-coated with a positive photoresist layer with a thickness of about 1 μm. The photoresist layer may be made of OFPR-800 (produced by Tokyo Ohka Kogyo Co., Ltd.), for example. Subsequently, after the photoresist layer has been pre-baked at about 100° C. for 30 minutes, a photomask is arranged on the photoresist layer to expose the photoresist layer to radiation through the mask.

Figure 8:
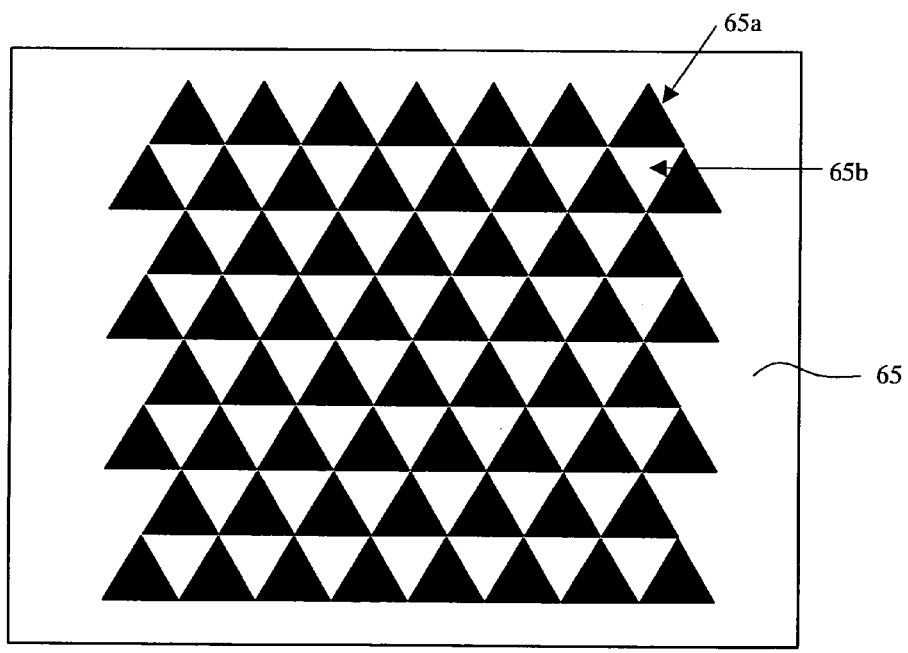
FIG. 8 is a plan view illustrating a photomask for use in the method of making a retroreflector according to the first preferred embodiment.

In this preferred embodiment, a photomask 65 such as that shown in FIG. 8 may be used. As shown in FIG. 8, in this photomask 65, equilateral triangular opaque regions 65a and inverse equilateral triangular transmissive regions 65b are alternately arranged in each of the three directions defined by the three sides of the triangles. The photomask 65 is arranged on the substrate 61 such that one of the three sides of each equilateral triangular pattern element representing an opaque region 65a is parallel to the <01-1> direction of the GaAs crystals. It should be noted that the negative sign preceding a direction index indicates herein that the direction index is negative. In this preferred embodiment, each equilateral triangular pattern element representing an opaque region 65a has a length of about 10 μm each side.

Thereafter, the exposed photoresist layer is developed with a developer NMD-3 2.38% (produced by Tokyo Ohka Kogyo Co., Ltd.), for example, thereby forming a photoresist pattern 62 on the substrate 61 as shown in FIGS. 5B and 6B. The photoresist pattern 62, which has been defined by using the photomask 65 shown in FIG. 8, is arranged on the substrate 61 such that one side of each equilateral triangular pattern element (i.e., the opaque region 65a) is parallel to the <01-1> direction of the GaAs crystals. In other words, the photoresist pattern 62 is arranged such that the three sides of each equilateral triangular pattern element thereof are parallel to {100} planes of the GaAs crystals.

In this preferred embodiment, the size of corner cubes to form may be controlled according to the arrangement pitch of the photoresist pattern 62. More specifically, the arrangement pitch of the corner cubes becomes approximately equal to the pitch P0 of the masking elements of the photoresist pattern 62. In this preferred embodiment, the pitch P0 is preferably about 10 μm.

It should be noted that the pattern of the etching mask layer is not limited to that shown in FIG. 5B but may be any of various other patterns. However, to form corner cubes in their intended shape, the predetermined point (e.g., the median point) of each masking element of the photoresist pattern 62 in the etching mask layer is preferably located at a honeycomb lattice point. As used herein, the "honeycomb lattice points" refer to the vertices and median points of respective rectangular hexagons when a predetermined plane is densely packed with the hexagons of completely the same shape with no gaps left between them. The "honeycomb lattice points" also correspond to the intersections between first and second groups of parallel lines that are defined in a predetermined plane. In this case, when the first group of parallel lines extend in a first direction and are spaced apart from each other at regular intervals, the second group of parallel lines extend in a second direction so as to define an angle of 60 degrees with the first group of parallel lines and are spaced apart from each other at the same regular intervals as the first group of parallel lines. Also, each masking element of the etching mask layer preferably has a planar shape that is symmetrical around a three-fold rotation axis (e.g., a triangular or hexagonal shape).

Figure 5C:
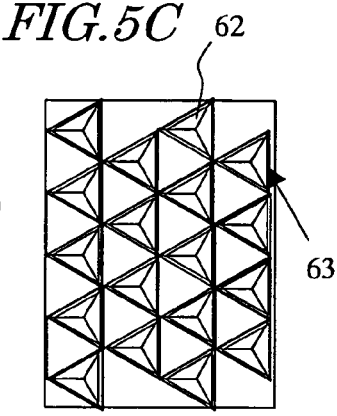
Figure 6C:
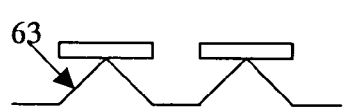

Next, as shown in FIGS. 5C and 6C, the substrate 61 is wet-etched while an etchant is stirred with a magnet stirrer. In this preferred embodiment, the wet etching process may be carried out at a temperature of about 20° C. for approximately 60 seconds using a mixture of $NH_4OH: H_2O_2: H_2O=1:2:7$ as the etchant.

Figure 9:
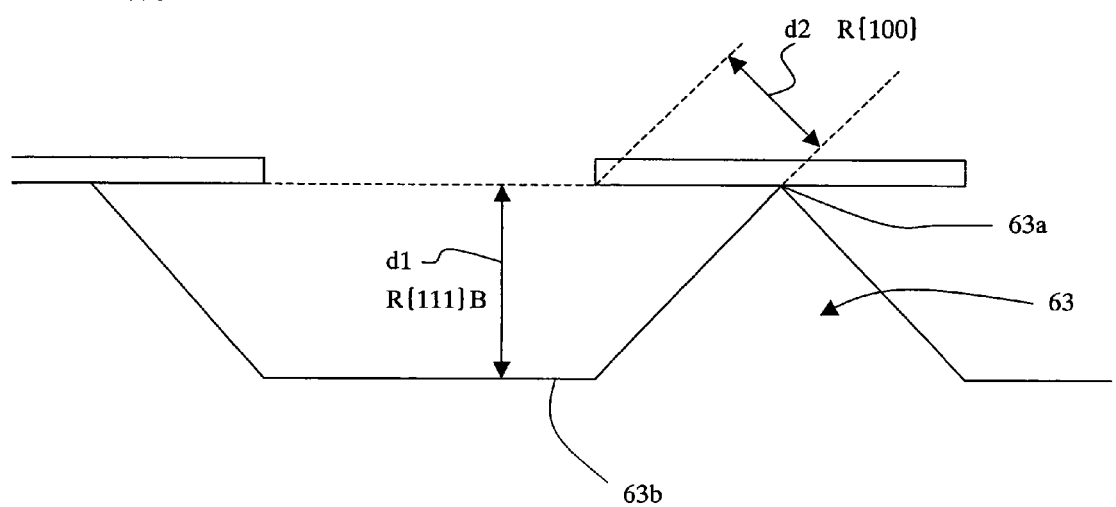
FIG. 9 is a schematic cross-sectional view showing how to define a solid shape element in the method of making a retroreflector according to the first preferred embodiment.

In this etching process, the {100} planes of the GaAs crystals, including the (100), (010) and (001) planes, are less easy to etch than the other crystallographic planes thereof. Thus, the etching process advances anisotropically so as to expose the {100} planes. However, in this etching process, the etch depth d1 of an opening as defined by one of the {111}B planes and the etch depth d2 of the same opening as defined by one of {100} planes preferably satisfy the relationship shown in FIG. 9.

As a result, when a vertex 63a is formed, a solid shape element 63 including a bottom (i.e., a flat portion) 63b is completed. In this manner, in this preferred embodiment, a plurality of convex portions 63, each having a vertex under its associated masking element 62, are formed as solid shape elements on the surface of the substrate 61 as shown in FIGS. 5C and 6C.

Each of these convex portions 63 preferably has the shape of a triangular pyramid, which is made up of three rectangular isosceles triangular planes to be defined by three {100} planes that are opposed perpendicularly to each other. That is to say, each convex portion 63 has a triangular pyramidal shape corresponding to one corner of a cube. Also, these convex portions 63 are arranged such that their vertices are located on the honeycomb lattice points and so as to have their arrangement pitch substantially equalized with the pitch P0 (e.g., 10 μm in this preferred embodiment) of the masking elements of the resist pattern 62.

It should be noted that the unevenness to be created by the wet etching process is changeable with an etching condition such as the type of the etchant adopted or the etch time. For example, if the etch rate ratio R{111}B/R{100} is relatively high (e.g., about 1.8 or more), then the resultant flat portion 63$b$ will have a decreased area as compared with the preferred embodiment shown in FIG. 4. Also, the solid shape elements arranged do not have to be a plurality of convex portions as described above but may also be a plurality of concave portions or a combination of concave and convex portions. Thus, in various preferred embodiments of the present invention, the solid shape elements to be arranged on the substrate are not always such triangular pyramidal convex portions but may have any other solid shape. In any case, however, those solid shape elements are preferably arranged such that their vertices are located on the honeycomb lattice points.

Figure 5D:
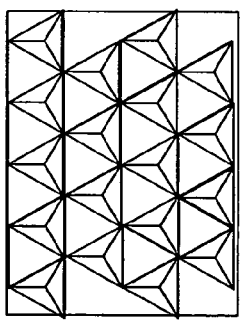
Figure 6D:
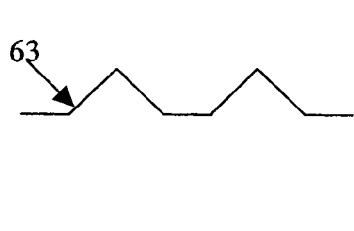

Subsequently, the substrate 61, on which the triangular pyramidal convex portions 63 have defined a predetermined pattern as a result of the anisotropic etching process described above, is subjected to ultrasonic cleaning using an organic solvent such as acetone, thereby removing the remaining unnecessary resist pattern 62 from the substrate 61 as shown in FIGS. 5D and 6D.

Thereafter, an anisotropic crystal growth process is carried out on the solid shape elements on the substrate by using a vapor deposition system. The vapor deposition system may be any of various known systems for use to deposit a thin film by an epitaxial growth process such as a vapor phase epitaxy (VPE) process, a molecular beam epitaxy (MBE) process, or a metal-organic vapor phase epitaxy (MOVPE) process. Into the vapor deposition system, gases of trimethylgallium (Ga(CH$_3$)$_3$) and arsine (AsH$_3$) are introduced. The crystal growth process can be carried out just as intended by supplying these gases for 100 minutes into an atmosphere at a reduced pressure of 10 Torr while heating the substrate to 630° C.

It should be noted that the active species used to trigger the crystal growth is typically supplied as a gas that includes an element (i.e., gallium or arsenic in this preferred embodiment) contained in the crystalline material of the substrate. In this manner, as in the trimethylgallium and arsine gases described above, the gas including the active species is typically a gas of a molecule that includes an element contained in the crystalline material of the substrate (i.e., at least one of gallium, a gallium compound, arsenic and an arsenic compound in this preferred embodiment). This is because in that case, crystals can be grown appropriately so as to achieve lattice matching with the crystalline material of the surface portion of the substrate.

In this crystal growth process, the surface of the substrate is exposed to the gases that include the elements (i.e., gallium and arsenic) contained in the crystalline material (i.e., GaAs) of the substrate. That is to say, active species are supplied onto the substrate. However, since the solid shape elements (i.e., the convex portions 63 in this preferred embodiment) have already been formed on the surface of the substrate, the GaAs crystals hardly grow perpendicularly to the {111}B planes thereof but selectively grow perpendicularly to the {100} planes thereof. In other words, the active species that are contained in the trimethylgallium and arsine gases do not cause any reaction on the bottoms (i.e., the {111}B planes) but do accelerate crystal growth preferentially on the sidewalls (i.e., the {100} planes). In this manner, the crystal growth advances anisotropically such that the growth rate thereof changes with the specific crystallographic plane orientation.

Figure 5E:
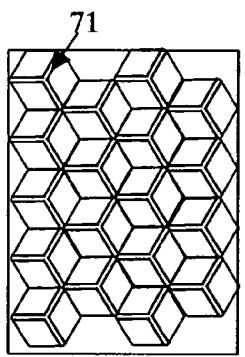

In such a crystal growth process, crystals grow selectively on the predetermined family of crystal planes (i.e., the {100} planes in this preferred embodiment). In this case, the crystal growing zones may be determined by the specific pattern of the solid shape elements that have been defined on the surface of the substrate. Thus, as shown in FIG. 5E, an array of unit elements, consisting mostly of {100} family of crystal planes (which will be sometimes referred to herein as an "initial unit element array"), is defined on the surface of the substrate. In the initial unit element array, non-{100} families of crystal planes are exposed along the edge lines 71 of the respective convex portions.

Figure 6E:
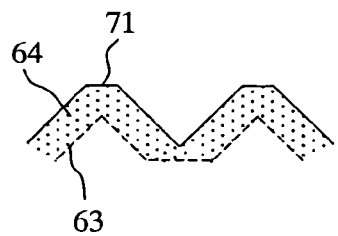

FIG. 6E is a cross-sectional view illustrating a portion of the substrate including the edge lines 71. As shown in FIG. 6E, a crystal layer 64 is formed on the convex portions 63 that have been defined by the etching process, and the edge lines 71 are defined by portions of the surface of the crystal layer 64. Each of these edge lines 71 typically includes triangular {111}B planes, which are created around the vertex of its associated convex portion, and {110} planes, which extend from the vertex and along the edges. These edge lines 71 are created because crystals grow relatively slowly in the <110> direction while the crystal layer 64 is being formed. Also, if the crystal growth process is continued under the same conditions, the edge lines 71 are going to expand.

Figure 5F:
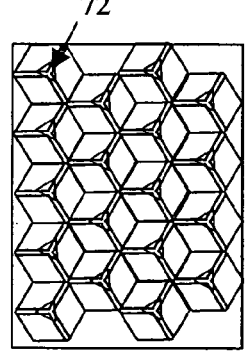
Figure 6F:
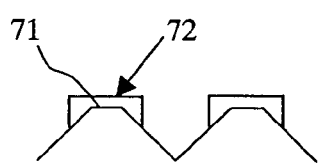

To remove these edge lines 71, a resist pattern 72 is defined as in FIG. 5B so as to cover the vertices of respective convex portions of the crystal layer 64 as shown in FIGS. 5F and 6F. In this process step, the area of each masking element of the resist pattern 72 is preferably smaller than that of its associated masking element of the resist pattern 62 shown in FIG. 5C.

Figure 5G:
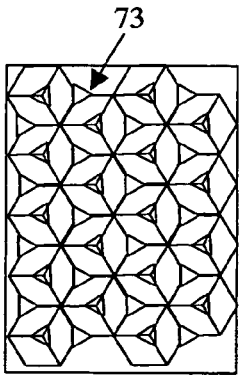
Figure 5H:
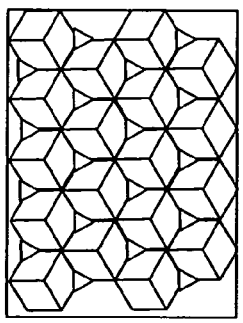
Figure 6G:
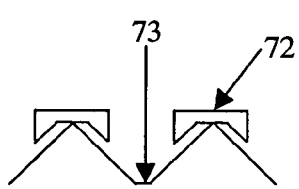
Figure 6H:
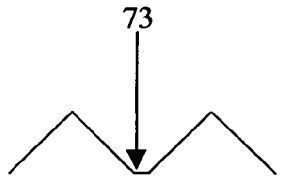

Next, as shown in FIGS. 5G and 6G, an anisotropic wet etching process is carried out. In this preferred embodiment, the wet etching process may be carried out at a temperature of about 20° C. for approximately 20 seconds using the same etchant (i.e., the mixture of NH$_4$OH: H$_2$O$_2$: H$_2$O=1:2:7) as that used in the process step shown in FIG. 5C. That is to say, the wet etching process shown in FIG. 5G is preferably carried out for a shorter time than the wet etching process shown in FIG. 5C. As a result of this wet etching process, the exposed surface of the substrate comes to have a cross-sectional shape such as that shown in FIG. 6G. As shown in FIG. 6G, the edge lines 71 now have a decreased area but triangular non-{100} crystal planes (which will be referred to herein as "triangular regions 73") are exposed at the concave portions of the substrate because the etchant also achieves an etch rate ratio R{111}B/R{100} of about 1.7. However, the overall area of these triangular regions 73 is typically smaller than that of the counterparts existing in the concave portions shown in FIG. 5C. Thereafter, a process step similar to that shown in FIG. 5D is carried out, thereby removing the remaining unnecessary resist pattern 72 from the substrate 61 as shown in FIGS. 5H and 6H.

Figure 5I:
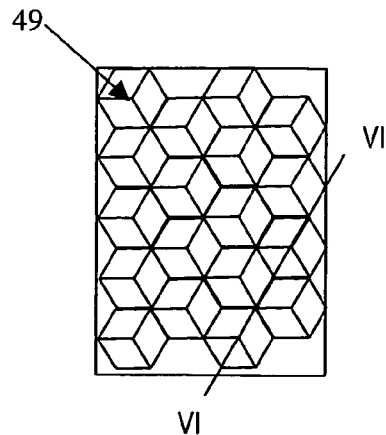
Figure 6I:

Thereafter, as shown in FIGS. 5I and 6I, the substrate 61 is subjected to the same crystal growth process again as that shown in FIG. 5E. The crystal growth process can be carried out just as intended by supplying the trimethylgallium (Ga(CH$_3$)$_3$) gas and arsine (AsH$_3$) gas for 20 minutes into an atmosphere at a reduced pressure of 10 Torr while heating the substrate to 630° C. That is to say, the crystal growth process shown in FIG. 5I is preferably carried out for a shorter time (i.e., 20 minutes in this case) than the crystal growth process shown in FIG. 5E. As a result of this crystal growth process, the unwanted crystal planes (i.e., the triangular regions 73) can be eliminated from the concave portions as shown in FIG. 6I and additional edge lines (not shown), having a smaller area than those shown in FIG. 5E, are newly formed on the convex portions. If the overall area of these additional edge lines 71 is equal to or smaller than a predetermined percentage, a square corner cube array 49 of a good shape is completed. On the other hand, if the overall area of the additional edge lines is still greater than the predetermined percentage, then the etching process step shown in FIGS. 5F, 5G and 5H and the crystal growth process step shown in FIG. 6I are repeatedly carried out a number of times.

As described above, unwanted non-{100} families of crystal planes remain on the initial unit element array formed by the first crystal growth process shown in FIG. 5E. Thus, the surface of the substrate with the initial unit element array is subjected to at least two different types of patterning processes to reduce the percentage of those unwanted non-{100} families of crystal planes to within the permissible range. Specifically, a type of patterning process, which can reduce unwanted planes in a surface portion A of the substrate but creates other unwanted planes in another surface portion B of the substrate, and another type of patterning process, which can reduce the unwanted planes in the surface portion B but creates other unwanted planes in the surface portion A, are repeatedly carried out alternately, thereby gradually decreasing the overall percentage of those unwanted families of crystal planes over the substrate.

Accordingly, if these two different types of patterning processes (e.g., etching and crystal growth processes) are repeated a greater number of times, then a square corner cube array 49 with an even higher shape precision can be obtained.

On the square corner cube array 49 that has been formed on a GaAs substrate in this manner, a metal layer 50 of silver or any other suitable material may be deposited by an evaporation process, for example, to a substantially uniform thickness (e.g., 200 nm) over the rugged surface of the GaAs substrate. In this manner, a retroreflector 48, including three substantially square reflective planes that are opposed substantially perpendicularly to each other, can be obtained.

A mold for the square corner cube array 49 that has been formed in this manner on the GaAs substrate may be obtained by an electroforming technique, for example. If the surface shape of the substrate 61 is transferred via such a mold onto a resin material by using a roller, for example, then a square corner cube array 49 made of the resin material may be obtained. Also, if the metal layer 50 is deposited on the surface of the square corner cube array 49, a retroreflector 48 can be obtained.

In the preferred embodiment described above, the substrate 61 is made of GaAs single crystals. Alternatively, the substrate 61 may also be made of single crystals of any other compound having a sphalerite structure, e.g., InP, InAs, ZnS or GaP. As another alternative, a substrate made of single crystals having a diamond structure (e.g., germanium crystals) may also be used.

Thereafter, by providing the liquid crystal cell 40 on the retroreflector 48 obtained in this manner such that the liquid crystal cell 40 is closer to the viewer than the retroreflector 48 is, the display device 103 is completed.

The method of making the retroreflector 48 is not limited to the above method, either. For example, the photomask 65 may also be arranged on the substrate such that one of the three sides of the equilateral triangular opaque areas 5a is parallel to the <011> directions of the GaAs crystals. Alternatively, a photomask having a different shape from that of the photomask 65 may be used, too. Furthermore, as disclosed in Applied Optics Vol. 35, No. 19, pp. 3466-3470, the initial unit element array may also be defined by forming the solid shape elements on the substrate using an SiO$_2$ pad and then performing a crystal growth process thereon. The two different types of patterning processes to be performed to reduced unwanted crystal planes other than {100} families of crystal planes may any combination of patterning processes satisfying the complementary relationship and are not limited to the above example. Accordingly, the locations of those unwanted crystal planes to be created after each of the two patterning processes are not limited to the above locations, either.

The retroreflector 48 does not have to have the configuration described above. For example, the corner cube array 49 may be made of a transparent material that transmits visible radiation. In that case, since the retroreflection (or total reflection) is realized by taking advantage of the difference in refractive index between the transparent material and the air, there is no need to provide any metal layer 50 on the surface.

The arrangement pitch of the unit elements in the retroreflector 48 is not limited to the above value, either, but may be arbitrarily defined so as to be smaller than the pixel pitch of the display device. More specifically, the arrangement pitch is preferably at most 250 μm, more preferably 200 μm or less, but needs to be at least equal to 100 nm. This is because if the arrangement pitch were less than 100 nm, then it would be difficult to make a retroreflector accurately enough. More preferably, the arrangement pitch should be at least equal to 500 nm.

The retroreflector 48 of the preferred embodiment described above is implemented as a square corner cube reflector. However, the present invention is in no way limited to that specific preferred embodiment. The retroreflector 48 only needs to be a reflector in which a plurality of unit elements are arranged regularly at an arrangement pitch of 250 μm or less so as to exhibit a desired retroreflection property (e.g., a retroreflectivity Rr of 45% or more). Thus, the retroreflector 48 may be implemented as a corner cube reflector in which a lot of triangular pyramidal corner cubes are arranged regularly.

Figure 4:
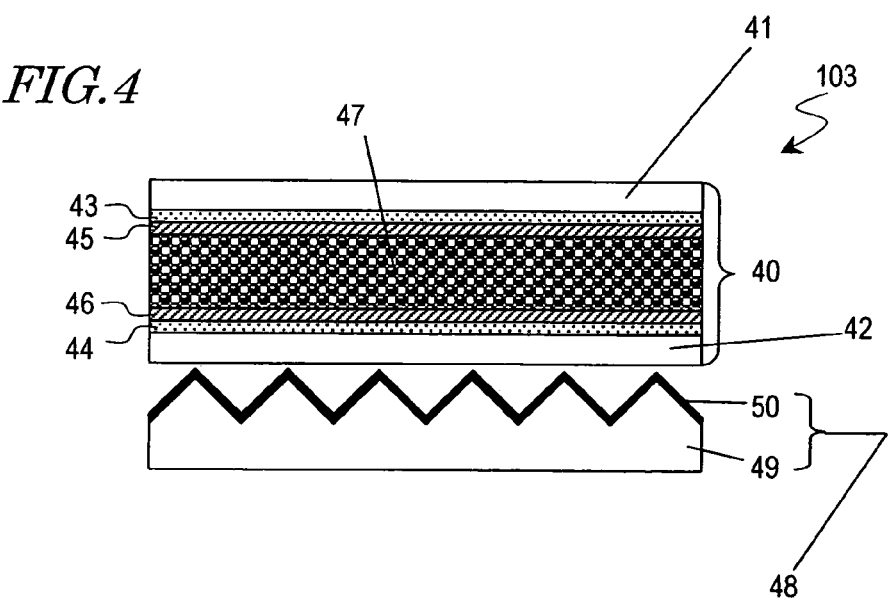
FIG. 4 is a cross-sectional view of a display device according to a first preferred embodiment of the present invention.

In the display device 103 shown in FIG. 4, the retroreflector 48 is provided outside of the liquid crystal cell 40 and there is a gap between them. Optionally, a transparent layer having approximately the same refractive index as the transparent substrate 42 may be provided in this gap. Alternatively, the corner cube array 49 may be made of a transparent material and the retroreflector 48 may be arranged such that the corner cube array 49 contacts with the transparent substrate 42 of the liquid crystal cell 40. In that case, the square corner cube array 49 may also function as the transparent substrate 42.

The material of the liquid crystal layer is not particularly limited. However, it is believed that the degree of variation in the brightness of the white display mode with the retroreflectivity Rr changes to a certain extent according to the material of the liquid crystal layer. In the preferred embodiment described above, the material of the liquid crystal layer is preferably a liquid crystal material, of which the brightness in the white display mode as measured with the measuring system shown in FIG. 2 with the retroreflectivity Rr of the retroreflector changed increases as the retroreflectivity Rr of the retroreflector increases.

The present inventors made four sample display devices A1 through A4 and evaluated their retroreflection property and rated their display performance. Specifically, those display devices were made in the following manner.

First, four different types of square corner cube arrays 49A through 49D (with the same arrangement pitch of 10 μm) were formed by the above method of making a square corner cube array 49 with the initial unit element array subjected to the two different types of patterning processes (i.e., the etching process and crystal growth process) mutually different numbers of times. In this example, the square corner cube arrays 49A through 49D were subjected to the two types of processes once, twice, three times and four times, respectively.

This process of making the square corner cube array 49A, 49B, 49C or 49D ended with the etching process of the two different types of patterning processes. Accordingly, in the resultant master, some unwanted planes (including the edge lines and various other non-ideal planes) were left in the concave portions of the unit elements, but almost no such unwanted planes remained at the convex portions around the peak points. By using this master as a die (or master substrate), its surface shape was transferred onto a resin material that had been applied on a substrate of glass, for example. As a result of this transfer process, the square corner cube array 49A, 49B, 49C or 49D was obtained. Thus, in the square corner cube array 49A, 49B, 49C or 49D obtained in this manner, some unwanted planes were left at the convex portions of the unit elements, but almost no such unwanted planes remained in the concave portions.

Next, a metal layer 50 of Ag, for example, was deposited on the surface of these corner cube arrays 49A through 49D, thereby making retroreflectors 48A through 48D.

Then, the retroreflectivities Rr of the retroreflectors 48A through 48D were estimated with the evaluation system 200 shown in FIG. 1. The results are shown in the following Table 1.

Thereafter, a liquid crystal cell 40 fabricated by the method described above was arranged on each of the retroreflectors 48A through 48D so as to be located closer to the viewer than the retroreflector 48A, 48B, 48C or 48D was, thereby obtaining sample display devices A1 through A4. The display performances of these sample display devices A1 through A4 were rated with the measuring system shown in FIG. 2. The results are also shown in the following Table 1:

TABLE 1

| Sample No. | Retroreflectivity Rr (%) | Brightness (%) in black display | Brightness (%) in white display | Contrast ratio |
|---|---|---|---|---|
| A1 | 46 | 26 | 55 | 2.1 |
| A2 | 56 | 16 | 73 | 4.6 |
| A3 | 64 | 9 | 70 | 7.8 |
| A4 | 72 | 2 | 72 | 36 |

As can be seen from the results shown in Table 1, a retroreflector 48 having a very small arrangement pitch and exhibiting a desired retroreflection property can be formed by the method described above. Also, since a square corner cube array 49 with an even higher shape precision can be obtained by repeatedly performing two different types of patterning processes a number of times, the retroreflection property of the retroreflector 48 can be further improved. This is because by repeatedly and alternately subjecting an initial unit element array to two or more different types of patterning processes, the percentage of unwanted crystal planes, other than {100} families of planes, in the initial unit element array can be reduced and a corner cube array with even higher shape precision can be obtained. When the shape precision improves, the ratio of the sum of the retroreflective areas to the overall reflective area of the corner cube array 49 increases, and therefore, the retroreflectivity Rr increases.

It can also be seen from the results of Table 1 that as the retroreflectivity Rr increased, the qualities of the white and black display modes both improved and the contrast ratio increased, too, thus realizing desired display performance. More specifically, when the two types of patterning processes (i.e., the etching and crystal growth processes) were repeatedly performed twice or more, for example, a retroreflector 48 with a retroreflectivity Rr of about 56% could be obtained. And by using such a retroreflector 48, a practical display device with a contrast ratio of 5 or more could be formed. Also, if the two types of patterning processes were repeated an increased number of times, the retroreflectivity Rr was further increased and a display operation of even higher quality could be conducted.

Embodiment 2

Hereinafter, a reflective display device according to a second specific preferred embodiment of the present invention will be described.

Figure 10:
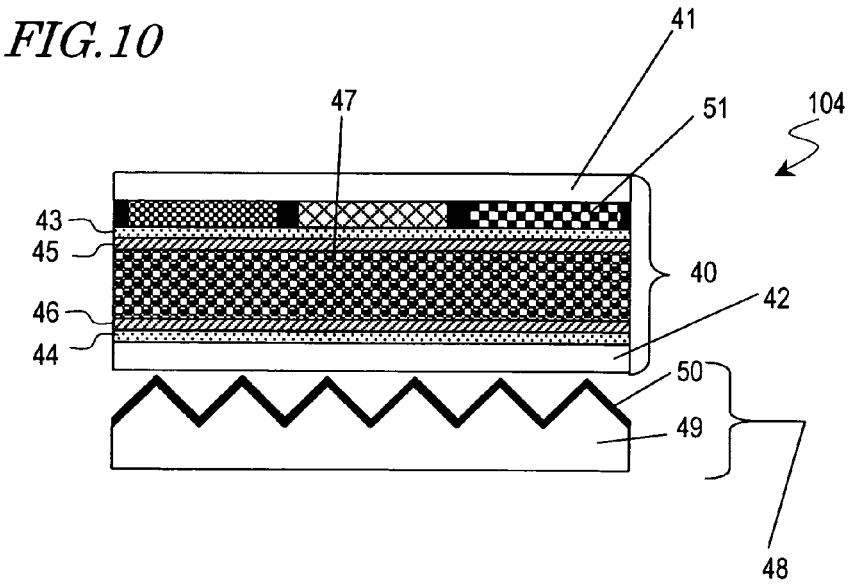
FIG. 10 is a cross-sectional view illustrating a display device according to a second specific preferred embodiment of the present invention.

First, the configuration of a display device 104 according to this preferred embodiment will be described with reference to FIG. 10. The display device 104 of this preferred embodiment is preferably a color display device.

The display device 104 has the same configuration as the display device 103 of the first preferred embodiment described above except that the display device 104 further includes a color filter layer 51 between the transparent substrate 41 closer to the viewer and the transparent electrode 43. More specifically, the color filter layer 51 preferably includes red (R), green (G) and blue (B) color filters, which are arranged in a regular pattern, and an opaque layer (or black matrix (BM)) provided between adjacent color filters. Each of these color filters may have dimensions of 50 μm×150 μm, for example. It should be noted that the dimensions of the color filters are changeable with the pixel pitch of the display device and are not limited to these values. Each color filter in the color filter layer 51 preferably has a somewhat higher transmittance than a color filter for use in a normal transmissive display device. Accordingly, the color of each color filter in the color filter layer 51 is close to that of its associated color filter for use in a reflective display device.

The display device 104 may be made of the same materials, and may be fabricated by the same method, as the display device 103 of the first preferred embodiment described above. The color filter layer 51 may be formed by performing a photolithographic process using an acrylate of a pigment dispersed type.

In this preferred embodiment, similar sample display devices B1 through B4 were also made. Among these sample display devices B1 through B4, the sample display device B1 used the retroreflector 48A of the first preferred embodiment described above. In the same way, the other sample display devices B2, B3 and B4 used the retroreflectors 48B, 48C and 48D, respectively. The retroreflectivities Rr and display performances of these sample display devices B1 through B4 were evaluated with the evaluation system 200 shown in FIG. 1 and rated with the measuring system 201 shown in FIG. 2. The results are shown in the following Table 2:

TABLE 2

| Sample No. | Retroreflectivity Rr (%) | Brightness (%) in black display | Brightness (%) in white display | Contrast ratio |
|---|---|---|---|---|
| B1 | 46 | 11 | 26 | 2.4 |
| B2 | 56 | 7 | 34 | 4.9 |
| B3 | 64 | 4 | 35 | 8.8 |
| B4 | 72 | 1 | 35 | 35 |

As can be seen from the results shown in Table 2, although the brightnesses of the black and white display modes decreased to certain degrees, the display performance of each display device in terms of the qualities of the black and white display modes and the contrast ratio also improved with the increase in the retroreflectivity Rr of the retroreflector 48 even if the color filter layer 51 was provided. The contrast ratio of each sample display device B1, B2, B3 or B4 with the color filter layer 51 was approximately equal to or higher than that of its associated sample display device A1, A2, A3 or A4 with no color filter layer 51 according to the first preferred embodiment described above.

Embodiment 3

Hereinafter, a reflective display device according to a third specific preferred embodiment of the present invention will be described.

First, the configuration of a display device 105 according to this preferred embodiment will be described with reference to FIGS. 11 and 12. The display device 105 of this preferred embodiment is an active-matrix-addressed display device.

Figure 12:
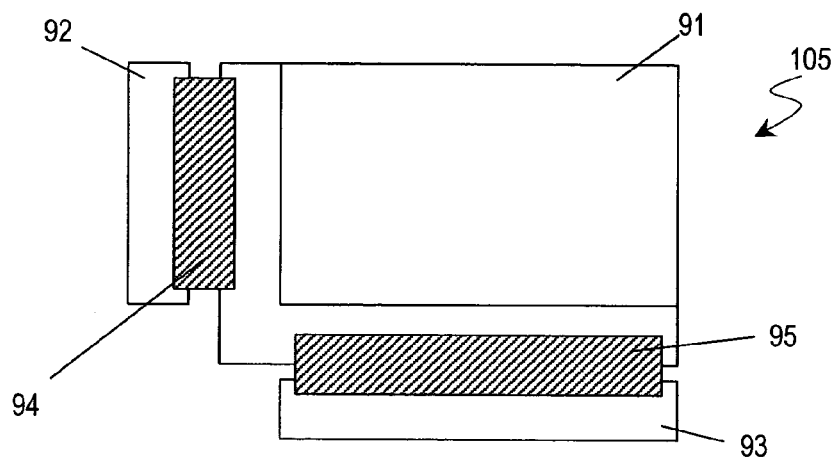
FIG. 12 is a plan view illustrating the configuration of the display device of the third preferred embodiment.

As shown in FIG. 12, the display device 105 preferably includes a display section 91 and driver circuitry for driving the display section 91.

Figure 11:
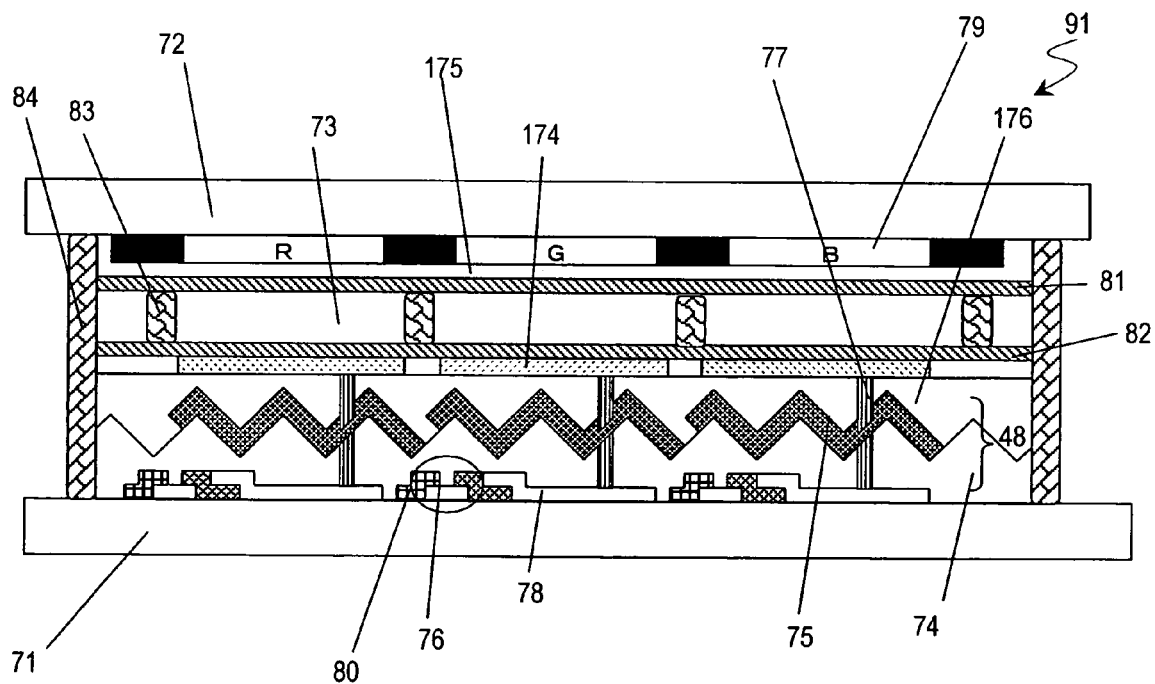
FIG. 11 is a cross-sectional view illustrating a display device according to a third specific preferred embodiment of the present invention.

FIG. 11 shows a detailed configuration of the display section 91. As shown in FIG. 11, the display section 91 includes a liquid crystal layer 73 and a retroreflector 48, which are provided between a pair of substrates 71 and 72 that are opposed to each other. The substrate 71 is an active-matrix substrate including multiple thin-film transistors 76 thereon. The retroreflector 48 includes a square corner cube array 74, which is provided on the substrate 71, and a metal layer 75, which is deposited on the square corner cube array 74. The metal layer 75 is made up of a plurality of island-like portions, which are arranged at a pixel electrode pitch corresponding to the pixel pitch (where each pixel may have dimensions of 50 μm×150 μm, for example) and function as electrodes as well. Over the retroreflector 48, the liquid crystal layer 73 is provided with pixel electrodes 174 and an alignment film 82 sandwiched between them. The liquid crystal layer 73 can have its thickness maintained at a desired value by spacers 83 and 84. To stabilize the property of the liquid crystal layer 73, a flattening layer 176 preferably fills the gap between the retroreflector 48 and the alignment film 82. Each pixel electrode 174 is preferably connected electrically to the drain electrode 78 of its associated thin-film transistor 76 and to the reflective layer 75 by way of a contact 77. Each contact 77 runs through the retroreflector 48 and flattening layer 176. On the other hand, on the inside surface of the substrate 72 located closer to the viewer, red (R), green (G) and blue (B) color filters 79 with a black matrix (BM), a common transparent electrode 175 and an alignment film 81 are stacked in this order so as to face the liquid crystal layer 73. The alignment film 81 is in contact with the liquid crystal layer 73. The liquid crystal layer 73 is preferably made of a liquid crystal material that realizes a scattering liquid crystal display mode (e.g., forward scattering display mode among other things). Also, the liquid crystal layer 73 is preferably a modulation layer that can switch between light transmitting state and scattering state upon the application of a voltage thereto, for example.

In this display device 105, the pixel electrode 174 and common transparent electrode 175 can apply a desired voltage to a selected portion of the liquid crystal layer 73. Thus, the state (i.e., the light transmitting state or scattering state) of the liquid crystal layer 73 can be controlled on a pixel-by-pixel basis.

Meanwhile, the driver circuitry for driving the display section 91 preferably includes a gate driver circuit 92 for selectively driving a thin-film transistor 76 in the display section 91, a source driver circuit 93 for supplying a signal to each pixel electrode 174 of the display section 91, a gate driver 94 and a source driver 95. Each pixel electrode 174 of the display section 91 is electrically connected to the source driver circuit 93 by way of the thin-film transistor 76, source line 80 and source driver 95. The switching operation of the thin-film transistors 76 is controlled through gate lines (not shown) provided on the substrate 71. These gate lines are electrically connected to the gate driver circuit 92 by way of the gate driver 94. An electrical signal, switched by a thin-film transistor 76, is output from the drain electrode 78 to its associated pixel electrode 174 via a contact 77.

The present inventors made three sample display devices C1, C2 and C3 to find how their display performance changed with the retroreflectivity Rr. Specifically, those display devices were made in the following manner.

First, a retroreflector 48E, 48F or 48G was provided on the active-matrix substrate by the same method as that already described for the first preferred embodiment. In this case, however, the metal layer 75 of Ag, for example, was deposited as a lot of islands so as to face their associated pixel electrodes 174. The arrangement pitch of the island portions of the metal layer 75 and pixel electrodes may be 50 μm in one direction and 150 μm in the other direction. The retroreflectors 48E, 48F and 48G were obtained by repeatedly performing the two different types of patterning processes (i.e., the etching and crystal growth processes) twice, three times and four times, respectively. Thereafter, the retroreflectivities Rr thereof were measured with the evaluation system 200 shown in FIG. 1. The results are shown in the following Table 3.

After the retroreflectivity Rr was measured, the surface of each retroreflector 48E, 48F or 48G was coated with a transparent material such as an acrylic resin, thereby forming a flattening layer 176 (with a maximum thickness of 10 μm). Then, contacts 77 were formed. Thereafter, pixel electrodes 174 of ITO, for example, and an alignment film 82 were formed thereon by known methods. The thickness of the flattening layer 176 is not particularly limited as long as the flattening layer 176 can flatten the surface of the retroreflector 48 by smoothing its unevenness.

In the meantime, a color filter layer 79 was formed on the other transparent substrate 72 by the method of the second preferred embodiment described above. Thereafter, a common transparent electrode 175 of ITO, for example, and an alignment film 81 were formed thereon by known methods.

Subsequently, these two substrates 71 and 72 were opposed to each other and a liquid crystal layer 73 was defined in the gap between them. In this preferred embodiment, a mixture of a liquid crystalline monomer, a nematic liquid crystal material, and a photoinitiator was injected into the gap and then exposed to an ultraviolet ray, thereby forming a forward scattering liquid crystal layer, which was transparent with no voltage applied but started scattering (including forward scattering) upon the application of a voltage thereto. In this manner, a sample display device C1 including the retroreflector 48E was obtained. In the same way, two more sample display devices C2 and C3 including the retroreflectors 48F and 48G, respectively, were also obtained.

The display performances of these sample display devices C1, C2 and C3 were rated with the measuring system 201 shown in FIG. 2. The results are shown in the following Table 3:

TABLE 3

| Sample No. | Retroreflectivity Rr (%) | Brightness (%) in black display | Brightness (%) in white display | Contrast ratio |
|---|---|---|---|---|
| C1 | 53 | 10 | 28 | 2.8 |
| C2 | 62 | 5 | 35 | 7 |
| C3 | 70 | 1.2 | 36 | 30 |

As can be seen from the results shown in Table 3, even if an active-matrix-addressed display device was fabricated using the retroreflector 48, the display performance also improved with the increase in retroreflectivity Rr as in the first and second preferred embodiments described above. Accordingly, if a retroreflector 48 with a predetermined retroreflection property is used, display devices realizing high-quality display can be supplied constantly.

Embodiment 4

Hereinafter, a reflective display device according to a fourth specific preferred embodiment of the present invention will be described.

The display device of this preferred embodiment has the same configuration as the display device of the first preferred embodiment shown in FIG. 4. In the method of making the retroreflector 48 for use in the display device shown in FIG. 4, the shape precision of the retroreflector 48 is controlled by adjusting the number of times the patterning processes are repeatedly performed on the initial unit element array, thereby realizing a desired retroreflection property. On the other hand, in the method of making the retroreflector 48 according to this preferred embodiment, a retroreflector 48 with an excellent retroreflection property is realized by controlling the number of times of transfers to make of the square corner cube array master 49', prepared by patterning a GaAs substrate, for example, before a square corner cube array is obtained as a final product 49.

More specifically, a square corner cube array 49, in which either the concave portions or the convex portions having the smaller number of unwanted non-retroreflective surfaces in the square corner cube array master 49' are used as the concave portions 49b, is obtained as a final product by controlling the number of times of transfers. Thus, by making a retroreflector 48 using this square corner cube array 49, a higher retroreflection property is achieved without deteriorating the shape precision.

The configuration of the square corner cube array 49 as a final product according to this preferred embodiment will be described with reference to the accompanying drawings.

Figure 13A:
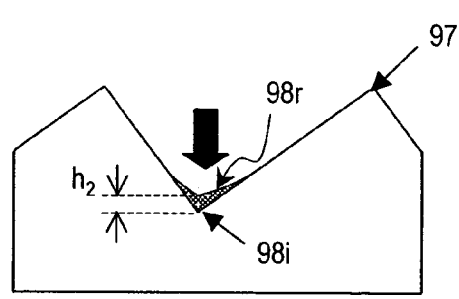
FIGS. 13A, 13B and 13C are enlarged cross-sectional views schematically illustrating exemplary configurations of a square corner cube array.
Figure 13B:
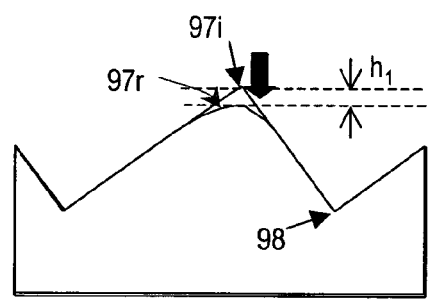
Figure 13C:
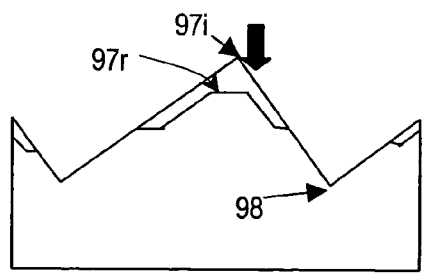

FIGS. 13B and 13C are enlarged cross-sectional views of the square corner cube array 49 as a final product according to this preferred embodiment. Supposing planes with non-ideal shapes are called "unwanted planes", the percentage of the unwanted planes created at the concave portions 49b is smaller than that of the unwanted planes created at the convex portions 49a in the square corner cube array 49 as a final product according to this preferred embodiment. The peak portion of the convex portion 49a has a rounded shape due to a deformed portion as shown in FIG. 13B or a partially missing portion as shown in FIG. 13C. Accordingly, the level of the peak point 97r of the convex portion 49a is lower than that of the peak point 97i of the convex portion with an ideal shape. On the other hand, the shape of the concave portion 49b is closer to its ideal shape than that of the convex portion 49a is. As used herein, the concave portion 49b refers to a portion that is farther away from the source of an incoming light ray, while the convex portion 49a refers to a portion that is closer to the source of an incoming light ray.

In the square corner cube array 49, the degrees of deformation at the concave and convex portions 49b and 49a (i.e., the percentages of the unwanted planes thereof) may be compared with each other by comparing the level difference $h_2$ between the bottom point 98r of the concave portion 49b and the ideal bottom point 98i with the level difference $h_1$ between the peak point 97r of the convex portion 49a and the ideal peak point 97i. These level differences $h_1$ and $h_2$ can be obtained by measuring the surface roughness at the concave and convex portions 49b and 49a with an atomic force microscope (AFM), for example. According to this method, the level difference $h_2$ at the concave portions 49b should be smaller than the level difference $h_1$ at the convex portions 49a in this corner cube array 49 as a final product according to this preferred embodiment.

Such a square corner cube array 49 as a final product may be obtained in the following manner.

Figure 14A:
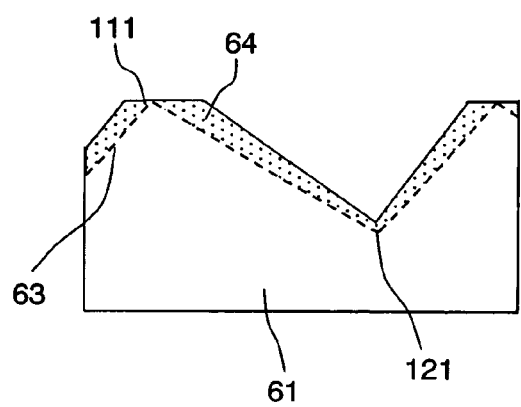
FIGS. 14A and 14B are cross-sectional views showing process steps for making a retroreflector according to a fourth specific preferred embodiment of the present invention.

First, as in the process steps shown in FIGS. 5A through 5D, the surface of the substrate is wet-etched anisotropically and then the resist pattern is removed. Thereafter, when the crystal growth process is performed by the technique shown in FIG. 5E, an initial unit element array is formed. FIG. 14A is a cross-sectional view illustrating a surface portion of the substrate on which the initial unit element array has been defined. This surface portion of the substrate consists of {100} planes except for the edge lines 111 (with a width of 2.2 μm, for example).

Figure 14B:
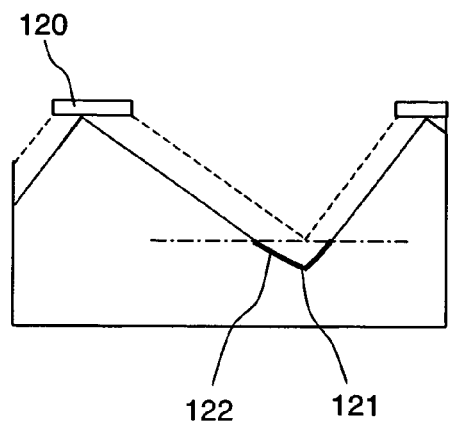

If the surface of the substrate 61, including the initial unit element array thereon, is wet-etched using the resist pattern 120, then the unwanted crystal planes, which make up the edge lines 111, can be eliminated but the bottom point 121 of the concave portion of the substrate 61 comes to have an unsharpened portion 122 as shown in FIG. 14B. The unsharpened portion 122 is a region, in which a huge number of steps, having {100} planes as terraces, are formed at an atomic level, and defines slopes around the {100} planes when viewed macroscopically. Thereafter, the resist pattern 120 is stripped to obtain the corner cube array master 49'.

Figure 15A:
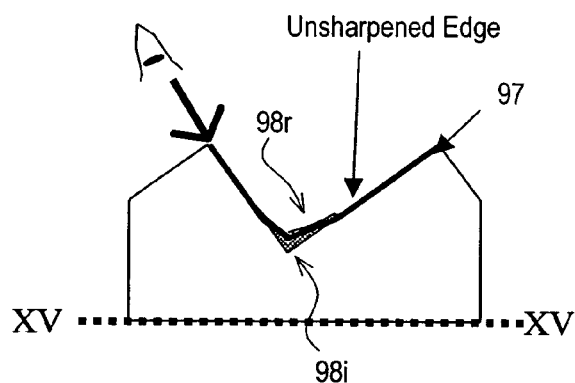
FIG. 15A is a cross-sectional view of the square corner cube array shown in FIG. 7A as viewed on the plane XV-XV shown in FIG. 7A.

The reflective surfaces of the corner cube array master 49' obtained in this manner have a shape such as that shown in FIG. 15A, which is a cross-sectional view as viewed on the plane XV-XV shown in FIG. 7A. As shown in FIG. 15A, there is a so-called "unetched portion" around the bottom portion 98r. Accordingly, the level of the bottom point 98r is higher than that of the ideal bottom point 98i. On the other hand, the convex portion 49a has a relatively good shape, and the level of the peak point 97r is approximately equal to that of the ideal peak point 97i.

Figure 15B:
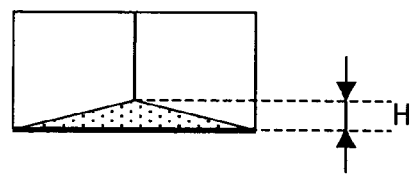
FIG. 15B is a plan view illustrating a concave portion 49b of the square corner cube array shown in FIG. 7A as viewed along one of the planes that make up the concave portion 49b.

If the concave portion 49b is viewed along one of the planes making up that concave portion 49b as shown in FIG. 15A, then the unetched portion is recognized as a substantially triangular "strip" as shown in FIG. 15B. By measuring the height H of this "strip", the ratio (%) of that height H to the corner cube arrangement pitch p (e.g., 10 μm in this preferred embodiment) is obtained. The degree of deformation (i.e., the percentage of unwanted planes) at the concave portion 49b is supposed to be rated by the magnitude of this H/p ratio. The corner cube array master 49' of this preferred embodiment has an H/p ratio of about 2.0%.

Next, the pattern of this corner cube array master 49' is transferred onto a resin.

Figure 16A:
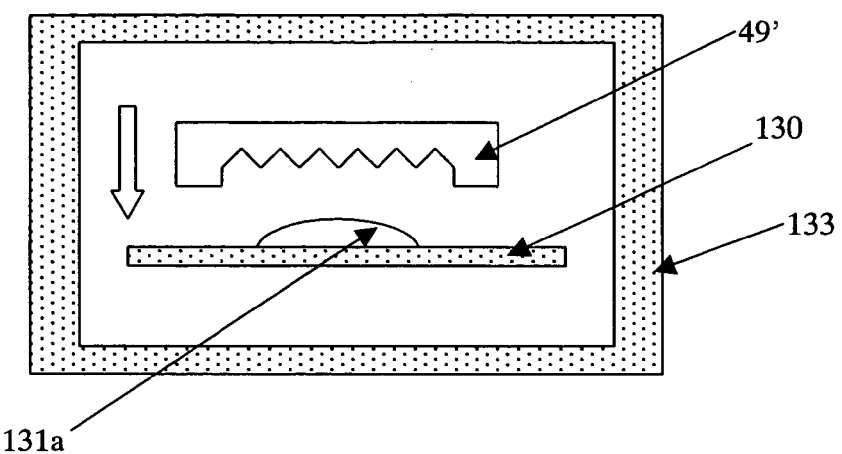
FIGS. 16A through 16C show a transfer process step in the method of making a retroreflector according to the fourth preferred embodiment.

As shown in FIG. 16A, after an acrylic resin 131a (e.g., MP-107 produced by Mitsubishi Rayon Co., Ltd.) has been dripped as a transfer resin for a 2P (photo polymer) method onto a glass substrate 130 (e.g., Corning glass 1737), the corner cube array master 49' is attached thereto at a reduced pressure within a chamber 133. In this manner, the gap between the substrate 130 and the corner cube array master 49' can be filled with the acrylic resin 131a without introducing bubbles thereto. Examples of preferred transfer resins include not only the acrylic resins but also two-part resins and thermoplastic resins for use in injection molding processes.

Figure 16B:
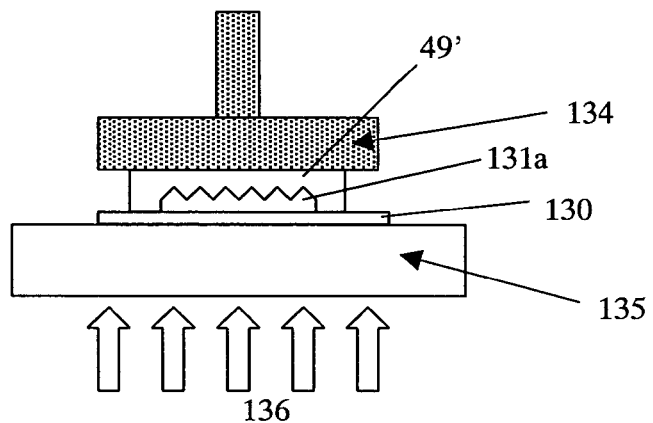

Thereafter, the acrylic resin 131a is cured. Specifically, as shown in FIG. 16B, the substrate 130 is fixed on a quartz plate 135, for example, and then subjected to a pressure of about 1 kg/cm$^2$ by a press machine 134 while the acrylic resin 131a is exposed to ultraviolet rays 136 that are emitted from a high-pressure mercury lamp with an intensity of 3 J/cm$^2$. The curing method and condition may change according to the type of the transfer resin. To cure the transfer resin, the resin may be heated or a curing accelerating agent may be added thereto.

Figure 16C:
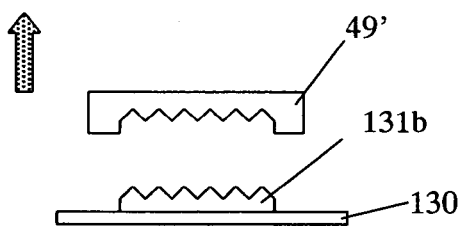

Subsequently, the corner cube array master 49' is released from the substrate 130, thereby obtaining a resin layer 131b with a square corner cube array shape (as a first transfer) on the substrate 130 as shown in FIG. 16C. The surface shape of this resin layer 131b is the inversion of that of the corner cube array master 49'. That is to say, the peaks of the convex portions of the resin layer 131b are rounded microscopically.

Then, the pattern of this resin layer 131b is transferred again to obtain a second transfer. In this preferred embodiment, the second transfer is used as a master substrate. As used herein, the "master substrate" refers to a mold for obtaining the final product 49 by a transfer technique. The master substrate may be formed by a known technique. For example, a master substrate of nickel (Ni) or any other suitable material may be formed by a combination of an electroforming method and a plating method. Since the electroforming method is one of the transfer methods, the shape of the resultant master substrate becomes approximately the same as that of the corner cube array master 49'. The master substrate is supposed to be a second transfer in this preferred embodiment but may be obtained by making transfers of an n$^{th}$ transfer k times (where k is an even number).

Finally, the shape of the master substrate is transferred to a resin material, for example, by a known transfer technique, thereby obtaining the corner cube array 49 as a final product. The base plate of the final product 49 may be either a film member of PET, for example, or a substrate including TFTs thereon. The surface shape of the corner cube array 49 as a final product becomes the inversion of that of the corner cube array master 49'. Accordingly, the peak level of the convex portion 49a is lower than that of the ideal convex portion but the concave portion 49b has a shape closer to that of the ideal concave portion.

The retroreflector 48 of the display device according to this preferred embodiment is obtained by depositing a reflective layer 50 on such a square corner cube array 49 as a final product.

In the preferred embodiment described above, the corner cube array master 49' is obtained by patterning a GaAs substrate. Alternatively, an Si substrate may be used as well. The method of making the master 49' is not limited to the above method, either, but may also involve a machining process such as a cutting process.

The material of the master substrate is not particularly limited. The master 49' of GaAs may be used as the master substrate as it is. Alternatively, by making transfers of the master 49' an even or odd number of times, a master substrate made of a material with excellent mechanical strength (e.g., Ni, which master substrate is called an "Ni stamper") or a master substrate made of a resin material such as a silicone resin may be prepared.

In order to form a corner cube array 49 with a desired shape as a final product by the method described above, the point is to control the number of times of transfers to make after the corner cube array master 49' has been prepared and before the corner cube array 49 is obtained as a final product.

For example, if the corner cube array master 49' having the shape shown in FIG. 13A has been prepared as described above, a corner cube array 49, of which the surface shape is the inversion of the shape shown in FIG. 13A, is obtained as a final product as shown in FIG. 13B or 13C by making transfers an odd number of times. On the other hand, if the wet etching process is further followed by a crystal growth process, for example, in preparing the corner cube array master, then a corner cube array master having the shape shown in FIG. 13B or 13C is obtained. In that case, the final product 49 may be obtained by making transfers of the master an even number of times. Alternatively, the master may be used as the final product 49 as it is.

It should be noted that as for each of the corner cube array master 49', master substrate and corner cube array 49 as a final product, the degrees of deformation at the concave and convex portions may be compared by the method of comparing the level differences $h_1$ and $h_2$ as described above.

The present inventors made a sample reflector D1 and evaluated the retroreflection property thereof. The results will be described later.

The sample reflector D1 was obtained in the following manner.

Figure 17A:
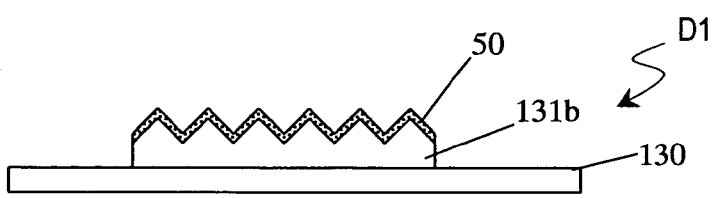
FIGS. 17A and 17B are cross-sectional views of sample reflectors D1 and D2 for use to evaluate the retroreflection property of a retroreflector according to the fourth preferred embodiment.

The shape of the corner cube array master 49' (with an arrangement pitch of 10 μm and an H/p ratio of 2.0%) prepared by the above method was transferred onto an acrylic resin by the method shown in FIGS. 16A through 16C, thereby obtaining a resin layer 131b. On the surface of this resin layer 131b with the corner cube array shape, a metal layer 50 of silver (Ag), for example, was deposited to a thickness of 1,500 Å by an evaporation process. In this manner, a sample reflector D1 was obtained by making a transfer of the corner cube array master 49' an odd number of times (i.e., once) as shown in FIG. 17A. The transfer process using a photosensitive resin was carried out just once on the sample reflector D1 for the sake of simplicity. However, even if the transfers are made by any of various other methods an odd number of times, a reflector with substantially the same shape can be obtained.

Figure 17B:
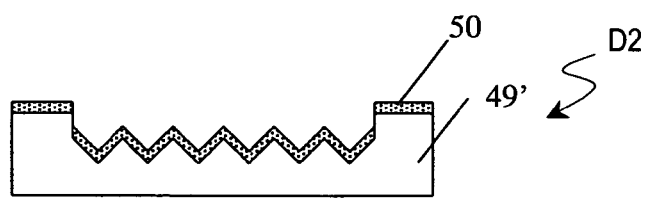

Meanwhile, a sample reflector D2, of which the shape is the inversion of that of the sample reflector D1, was also prepared for the sake of comparison. The sample reflector D2 was obtained by directly depositing a metal layer 50 of Ag, for example, to a thickness of 1,500 Å on the surface of the master 49' with the corner cube array shape as shown in FIG. 17B. In this example, the GaAs substrate, i.e., the master 49', was used as the sample reflector D2. Alternatively, a reflector having substantially the same shape as the sample reflector D2 can be obtained even by making transfers of the master 49' an even number of times.

The retroreflectivities Rr of the sample reflectors D1 and D2 obtained in this manner were measured with the evaluation system 200 shown in FIG. 1. The results are shown in the following Table 4:

TABLE 4

|  | H/p of master | Retroreflectivity Rr |
| --- | --- | --- |
| Sample reflector D1 | 2.0% | 50% |
| Sample reflector D2 | 2.0% | 38% |

As can be seen from the results shown in Table 4, even if retroreflectors 48 with similar shape precisions are made from the same master 49', the retroreflection property changes significantly according to the number of times of transfers to make in forming the retroreflectors 48. That is to say, if a retroreflector 48, in which the percentage of unwanted planes at the convex portions is greater than that of unwanted planes at the concave portions, is formed by controlling the number of times of transfers, the retroreflection property can be improved.

In this manner, according to the preferred embodiment described above, the locations of unwanted crystal planes in the final product 49 can be controlled by changing the number of times of transfers to make before the corner cube array 49 is obtained as the final product. Thus, a retroreflector 48 with excellent retroreflection property can be obtained. By using such a retroreflector, a display device with high display performance is realized.

Also, if the two different types of patterning processes are repeatedly performed in making the corner cube array master 49' as described for the first preferred embodiment, a master 49' with an even higher shape precision (i.e., having much less excessive portions) can be obtained. In the manufacturing process described above, the last process step is the etching process. However, if the crystal growth and etching processes are further performed repeatedly after that, the shape of the master 49' can be even closer to the ideal one.

Thus, the present inventors modeled a number of masters 49' with the two processes repeated different numbers of times and analyzed the relationship between the ratio of the excessive portions in the master 49' and the retroreflection property of the final product 49. In this case, the two types of sample reflectors D1 and D2 with mutually opposite shapes were made from each of those masters 49' by the method described above and the retroreflectivities Rr thereof were measured with the evaluation system 200 shown in FIG. 1. The results are shown in FIG. 18.

Figure 18:
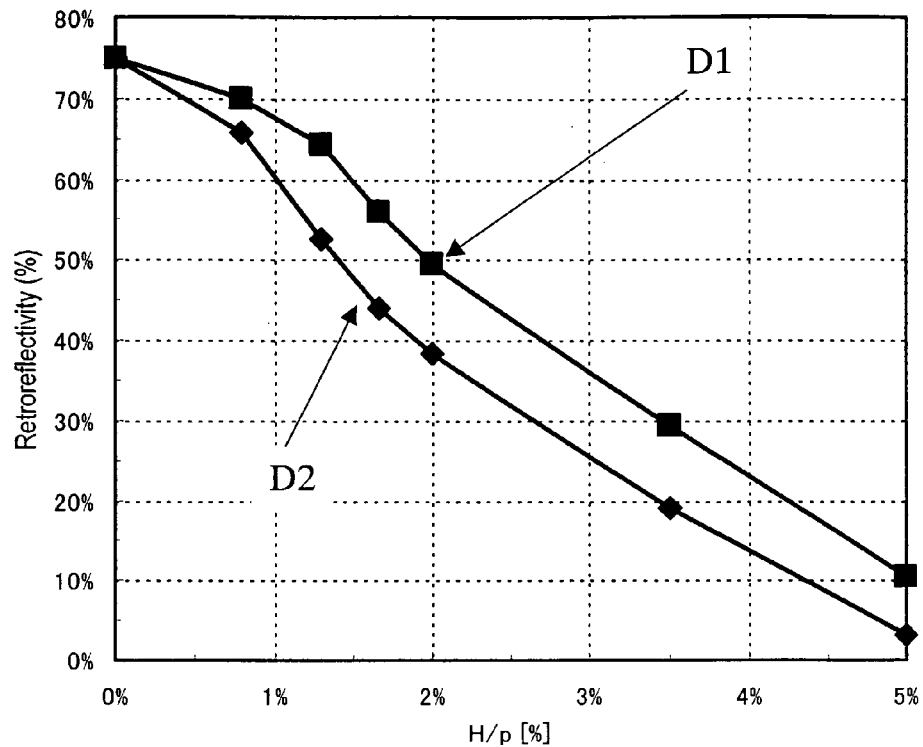
FIG. 18 is a graph showing how the retroreflectivity Rr changes with the H/p ratio.
Figure 19:
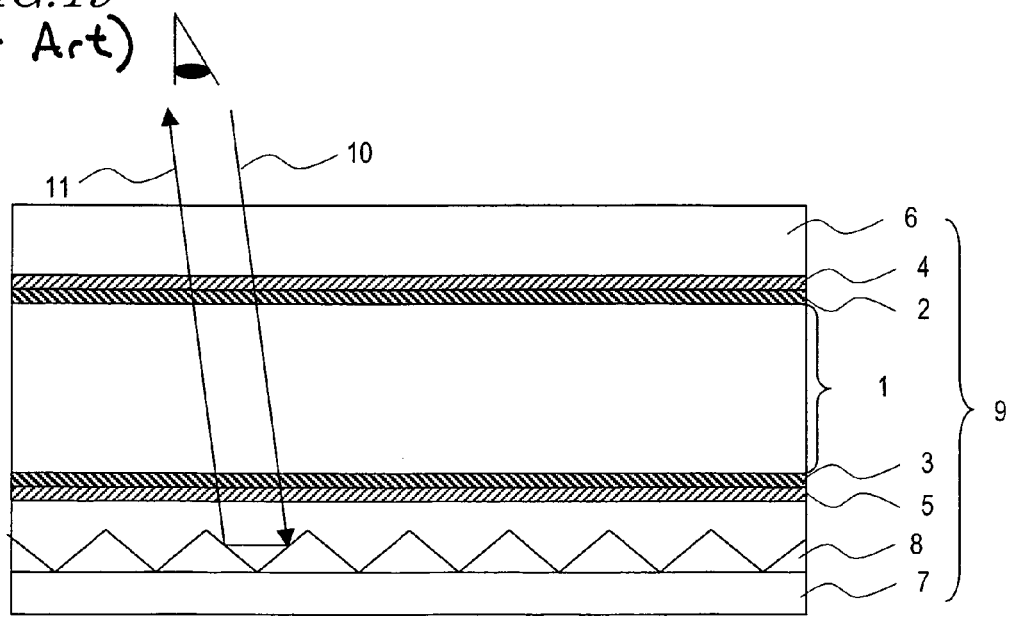
FIG. 19 is a cross-sectional view illustrating a configuration for a conventional reflective display device with a retroreflector.

As can be seen from the results shown in FIG. 18, even if a master 49' with a low shape precision (i.e., with a high H/p ratio) is used, a retroreflector with high retroreflection property can still be obtained by controlling the number of times of transfers. For example, if a master 49' with an H/p ratio of 2.3% or more is formed by repeatedly performing the two different types of patterning processes, a retroreflector 48 with a retroreflectivity Rr of 45% or more can be obtained by adjusting the number of times of transfers to make after that. In the same way, if a master 49' with an H/p ratio of 2.0% or less is formed, a retroreflector 48 with a retroreflectivity Rr of 50% or more can be obtained by adjusting the number of times of transfers to make after that.

Various preferred embodiments of the present invention described above provide a reflective display device including a retroreflector to realize excellent display performance.

In addition, preferred embodiments of the present invention also provide a highly reliable method of evaluating the retroreflection property of a retroreflector easily, thus contributing to constant supply of reflective display device products with high display performance.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Application No. 2003-366158 filed in Japan on Oct. 27, 2003, the entire contents of which are hereby incorporated by reference.

What is claimed is:

1. A reflective display device comprising:
   a retroreflective layer; and
   a modulation layer, which is provided closer to a viewer than the retroreflective layer is and which is switchable between first and second states with mutually different optical characteristics,
   wherein the retroreflective layer includes a two-dimensional arrangement of unit elements, which are arranged at a pitch of at most 250 µm, and
   wherein the retroreflective layer has a retro-reflectivity Rr of at least 45%, the retroreflectivity being defined as a ratio of the intensity of light, which has been reflected from the retroreflective layer and then received at a cone angle of 7.5 degrees by a retroreflectivity measuring system, to that of light, which has been reflected from a dielectric mirror and then received by the same retroreflectivity measuring system, and wherein the unit elements are square corner cubes.

2. The reflective display device of claim 1, wherein the retroreflective layer has a retroreflectivity Rr of 60% or more.

3. The reflective display device of claim 1, wherein the unit elements have an arrangement pitch of 20 µm or less.

4. The reflective display device of claim 1, wherein the unit elements have an arrangement pitch of at least 100 nm.

5. The reflective display device of claim 1, wherein the unit elements have an arrangement pitch of 500 nm or more.

6. The reflective display device of claim 1, wherein the first state is a transmitting state in which the modulation layer transmits incident light, while the second state is a scattering state in which the modulation layer scatters the incident light, and wherein the display device enters a black display mode while the modulation layer is in the transmitting state and enters a white display mode while the modulation layer is in the scattering state.

7. The reflective display device of claim 6, wherein the ratio of the luminance of the white display mode, which is measured by a luminance measuring system with a light receiving angle set to 3 degrees, to that of the black display mode, which is also measured by the same luminance measuring system, is 5 or more.

8. The reflective display device of claim 6, wherein the ratio of the luminance of the white display mode, which is measured by a luminance measuring system with a light receiving angle set to 3 degrees, to that of the black display mode, which is also measured by the same luminance measuring system, is 10 or more.

9. The reflective display device of claim 1, wherein if the brightness of the white display mode is measured by the luminance measuring system with the retroreflectivity Rr of the retroreflector changed, the modulation layer is made of a liquid crystal material that increases the brightness of the white display mode as the retroreflectivity Rr of the retroreflector increases.

* * * * *